US007036486B2

(12) United States Patent
Kamimura et al.

(10) Patent No.: US 7,036,486 B2
(45) Date of Patent: May 2, 2006

(54) ELECTRONICALLY CONTROLLED THROTTLE APPARATUS

(75) Inventors: Yasuhiro Kamimura, Tokyo (JP); Yasuhisa Uchiyama, Tokyo (JP); Syuuichi Nakano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/975,402

(22) Filed: Oct. 29, 2004

(65) Prior Publication Data

US 2005/0092292 A1 May 5, 2005

(30) Foreign Application Priority Data

Oct. 30, 2003 (JP) ............................ 2003-370002

(51) Int. Cl.
*F02D 11/10* (2006.01)
*F16K 1/22* (2006.01)

(52) U.S. Cl. ....................... 123/399; 123/396; 123/337

(58) Field of Classification Search ................ 123/399, 123/337, 568.11, 568.14
See application file for complete search history.

(56) References Cited

U.S. PATENT DOCUMENTS 5,983,858 A * 11/1999 Hashimoto et al. ......... 123/396
6,047,680 A * 4/2000 Shimura et al. ............ 123/399
6,691,681 B1 * 2/2004 Wayama et al. ............ 123/399
6,739,312 B1 * 5/2004 Komeda et al. ............ 123/337
6,776,137 B1 * 8/2004 Kawai et al. ............... 123/399
2003/0041593 A1 3/2003 Yoshida et al.
2005/0098163 A1 * 5/2005 Andoh et al. .......... 123/568.18

FOREIGN PATENT DOCUMENTS

| | | | |
|---|---|---|---|
| DE | 197 28 480 A1 | | 1/1998 |
| DE | 198 48 368 A1 | | 4/2000 |
| JP | 07-332136 | | 12/1995 |
| JP | 10-030675 | | 2/1998 |
| JP | 2002-256892 | | 9/2002 |
| JP | 2003-214196 | | 7/2003 |
| JP | 2005-133624 | * | 5/2005 |

* cited by examiner

*Primary Examiner*—Hai Huynh
(74) *Attorney, Agent, or Firm*—Crowell & Moring LLP

(57) ABSTRACT

That is an electronically controlled throttle device comprising a throttle valve held rotatably in a throttle body; an actuator for driving the throttle valve; a return spring which gives a force to return the throttle valve in the full open direction; a throttle position sensor for detecting the opening of the throttle valve; and a throttle actuator control unit for driving the actuator based on the opening of the throttle valve detected by the throttle position sensor and a target opening. Wherein the throttle actuator control unit is provided with a control means which controls the actuator, when EGR control or DPF control has ended, so that the throttle valve turns toward the full open position in a longer period of time than the length of time in which the throttle valve is turned toward the full open position by the return spring only.

23 Claims, 12 Drawing Sheets

ELECTRONICALLY CONTROLLED THROTTLE APPARATUS

CLAIM OF PRIORITY

The present application claims priority from Japanese application serial no. 2003-370002 filed on Oct. 30, 2003, the contents of which are hereby incorporated by reference into this application.

BACKGROUND OF THE INVENTION

The present invention relates to an electronically controlled throttle device for electrically controlling the quantity of air intake to a vehicle-mounted engine, and more particularly to an electronically controlled throttle device suitable for a diesel engine.

An electronically controlled throttle apparatus (electronic throttle apparatus) which controls the quantity of air intake into a gasoline engine by optimally driving an actuator (e.g. a DC motor, torque motor, or stepping motor) are already in use. Such an throttle apparatus controls the position of the throttle valve with an actuator so as to make it identical with a target opening computed according to the treading depth of the accelerator pedal or the operating state of the engine. And the throttle apparatus detects its behavior with a throttle position sensor, and corrects the position under feedback control.

Conventional electronic throttle apparatuses include a structure which, as described in the Japanese Patent Laid-Open No. H10(1998)-30675 for instance, is provided with a drive mechanism equipped with an actuator for controlling the throttle valve position and a throttle position sensor for detecting the throttle valve position, which are arranged in a sealed space, with the wiring for the sensor and the actuator being integrated.

The other throttle apparatuses for controlling the throttle position also include one by which, as described in the Japanese Patent Laid-Open No. H7(1995)-332136 for instance, a control quantity corresponding to the deviation of the actual opening of the throttle valve from the target opening is computed by PID control or a similar technique. The computed control quantity is converted into a duty ratio, which is the ratio between the on time and the off time of pulse driving, a PWM signal is supplied to a DC motor via an H bridge circuit. The motor generates torque, and the throttle valve is driven by the generated torque via a gear and a throttle shaft to control the position.

The Electronic throttle apparatuses described above are generally used for gasoline engines. Recently, electronic throttle apparatuses are beginning to be applied to diesel engines with a view to enhancing the EGR efficiency and improvement in dieseling. Since electronic throttle apparatuses for diesel engines, unlike those for gasoline engines, perform control to enhance the EGR efficiency or to burn soot in the DPF (diesel particulate filter). The DPF is performed by raising the exhaust temperature by throttling the air intake. In diesel engines, the motor control is stopped when neither EGR control nor DPF control is performed, and the throttle valve is in its full open position. Accordingly, they are significantly different from gasoline engines in that 1) the full open position is maintained for a long period, 2) there is a transition from the active state of motor control to its stopped state or a transition vice versa, and 3) Since there is no runaway mode, a default mechanism, which holds any arbitrary degree of opening for supplying a constant quantity of air when power supply to the motor is off, is unnecessary.

In electronic throttle apparatuses for diesel engines, when EGR control or DPF control has ended, there is no need to control the air flow rate by throttle valve like gasoline engines. Therefore, when power supply to the motor is turned off, the throttle valve is returned by a return spring to the full open position, thereby the pressure loss of the air intake is least. Thus, unlike electronic throttle apparatuses for gasoline engines which perform control all the time, they always have a transition from the active state of motor control to its stopped state or a transition opposite to it.

To begin with, considering a transition from the active state of motor control to its stopped state, a first problem is as follows. When power supply to the motor is simply turned off or the provided duty is reduced to 0% at the time of stopping the control, the throttle valve position is returned to the full open position by a return spring rapidly. Then the full open stopper of the throttle valve and drive mechanism parts will violently clash with each other, inviting problems of collision noise and an effect of the impact load to shorten the service life of mechanical parts.

As an attempt to cope with this problem, an electronic throttle apparatus which is provided with a buffer mechanism between the fully open stopper and gears to mechanically prevent from collision is known, as described in the Japanese Patent Laid-Open No. 2002-256892 for instance.

In another known electronic throttle device described in the Japanese Patent Laid-Open No. 2003-214196, for instance, it is intended to prevent from the collision by supplying a preset predetermined value (power), which drives the motor at a lower speed than under normal control, to the motor for any arbitrary length of time.

However, the formula described in the Japanese Patent Laid-Open No. 2002-256892 involves the problems of the additional cost of the buffer mechanism, the reduced effect of a deteriorated buffer mechanism, and a loss in reliability due to the increased number of components.

On the other hand, in the formula described in the Japanese Patent Laid-Open No. 2003-214196, because it is to perform control by supplying a preset predetermined value to the motor for any arbitrary length of time, there are differences among individual products in response time and other respects. Therefore, it has the possibility that the motor may continue to drive even if the throttle valve returns to its full open position, and an excess current may damage the motor or a consequent overload may work on and damage mechanical parts.

SUMMARY OF THE INVENTION

An object of the present invention is to provide an electronically controlled throttle control apparatus increased in reliability, involving no risk of damaging the motor or mechanical parts, and permitting reductions in mechanical collision noise and impact energy.

(1) In order to achieve the object stated above, the present invention is provided as follows.

That is an electronically controlled throttle device comprising a throttle valve held rotatably in a throttle body; an actuator for driving the throttle valve; a return spring which gives a force to return the throttle valve in the full open direction; a throttle position sensor for detecting the opening of the throttle valve; and a throttle actuator control unit for driving the actuator based on the opening of the throttle valve detected by the throttle position sensor and a target opening. Wherein the throttle actuator control unit is provided with a control means which controls the actuator, when EGR control or DPF control has ended, so that the throttle valve turns toward the full open position in a longer period of time than the length of time in which the throttle valve is turned toward the full open position by the return spring only.

Such a configuration makes it possible to increase reliability, eliminate damage to the motor or mechanical parts, and reduce mechanical collision noise and impact energy.

(2) In (1) described above, preferably the control means should perform an open loop control by providing the actuator with a control signal corresponding to a target angle which causes the throttle valve to gradually turn toward the full open position of the throttle valve.

(3) In (2) described above, preferably the control means should gradually decrease the duty of duty signal given to the actuator.

(4) In (1) described above, preferably the control means should repeat, when EGR control or DPF control has ended, a controlled state and a non-controlled state of the actuator.

(5) In (4) described above, preferably the control means should cause, in the controlled state, the actuator to operate as a regenerative brake.

(6) In (4) described above, preferably the control means should cut off, in the non-controlled state, electric power supply to the actuator.

(7) In (6) described above, preferably the control means should forcibly fix the duty of the duty signal given to the actuator to 0% and output it.

(8) In (4) described above, preferably the control means should cut off power supply to the actuator if the result of self-diagnosis of the throttle position sensor or the like is abnormal.

(9) In (4) described above, preferably the control means should repeat, after it is determined that EGR control or DPF control has ended, the controlled state and the non-controlled state of the actuator for a predetermined length of time after performing control to hold the opening of the throttle valve in the vicinity of the full open point for a predetermined length of time.

(10) In (1) described above, preferably the control means should place, after it is determined that EGR control or DPF control has ended, the actuator in a non-controlled state for a predetermined length of time after performing control to hold the opening of the throttle valve in the vicinity of the fully open point for a predetermined length of time.

(11) In (10) described above, preferably the control means should repeat, after it is determined that EGR control or DPF control has ended, a controlled state and the non-controlled state of the actuator for a predetermined length of time after performing control to hold the opening of the throttle valve in the vicinity of the fully open point for a predetermined length of time.

(12) In (10) described above, preferably the control means should determine that EGR control or DPF control has ended when a state in which the target opening of the throttle valve surpasses a predetermined target opening, the variation quantity of the target opening is not greater than a predetermined opening variation quantity, and the target opening is not less than a predetermined opening and its variation quantity is not greater than a predetermined opening variation quantity continues for a period not less than a predetermined length of time.

(13) In (11) described above, preferably the control means should start again the actuator control in the event that at least one of the three conditions fails to be satisfied after having determined that EGR control or DPF control has ended.

(14) In (1) described above, preferably the electronic throttle body should be provided with a first gear fixed to the output shaft of the actuator, a second gear fixed to a throttle shaft supporting the throttle valve, and an intermediate gear which transmits a driving force for the second gear from the first gear, and further provided with a washer, which is a wear-resistant member, between the intermediate gear and the throttle body supporting this intermediate gear.

(15) In order to achieve the object stated above, an electronically controlled throttle device comprising a throttle valve held rotatably in a throttle body; an actuator for driving the throttle valve; a return spring which gives a force to return the throttle valve in the full open direction; a throttle position sensor for detecting the opening of the throttle valve; and a throttle actuator control unit for driving the actuator based on the opening of the throttle valve detected by the throttle position sensor and a target opening.

Wherein the throttle actuator control unit is provided with a control means which controls the actuator, when EGR control or DPF control has ended, so that the throttle valve turns toward the full open position in a longer period of time than the length of time in which the throttle valve is turned toward the full open position by the return spring only. Furthermore, the particulars of the control means is that performs an open loop control by providing the actuator with a control signal corresponding to a target angle which causes the throttle valve to gradually turn in the full open direction of the throttle valve.

Such a configuration makes it possible to increase reliability, eliminate damage to the motor or mechanical parts, and reduce mechanical collision noise and impact energy.

(16) In order to achieve the object stated above, an electronically controlled throttle apparatus comprising a throttle valve held rotatably in a throttle body; an actuator for driving the throttle valve; a return spring which gives a force to return the throttle valve in the full open direction; a throttle position sensor for detecting the opening of the throttle valve; and a throttle actuator control unit for driving the actuator based on the opening of the throttle valve detected by the throttle position sensor and a target opening.

The throttle actuator control unit is provided with a control means which repeats, when EGR control or DPF control has ended, a controlled state and a non-controlled state of the actuator, so that the throttle valve turns toward the full open position in a longer period of time than the length of time in which the throttle valve is turned toward the full open position by the return spring only.

Such a configuration makes it possible to increase reliability, eliminate damage to the motor or mechanical parts, and reduce mechanical collision noise and impact energy.

(17) In order to achieve the object stated above, an electronically controlled throttle apparatus comprising a throttle valve held rotatably in a throttle body; an actuator for driving the throttle valve; a return spring which gives a force to return the throttle valve in the full open direction; a throttle position sensor for detecting the opening of the throttle valve; and a throttle actuator control unit for driving the actuator based on the opening of the throttle valve detected by the throttle position sensor and a target opening.

The throttle actuator control unit is provided with a control means which controls the actuator, when EGR control or DPF control has ended, so that the throttle valve turns toward the full open position in a longer period of time than the length of time in which the throttle valve is turned toward the full open position by the return spring only. Furthermore, the particulars of the control means is that repeats the controlled state and the non-controlled state of the actuator after performing control to hold the opening of the throttle valve in the vicinity of the full open point for a predetermined length of time.

Such a configuration makes it possible to increase reliability, eliminate damage to the motor or mechanical parts, and reduce mechanical collision noise and impact energy.

(18) In order to achieve the object stated above, an electronically controlled throttle apparatus comprising a throttle valve held rotatably in a throttle body; an actuator for driving the throttle valve; a return spring which gives a force to return the throttle valve in the full open direction; a throttle position sensor for detecting the opening of the throttle valve; and a throttle actuator control unit for driving the actuator based on the opening of the throttle valve detected by the throttle position sensor and a target opening.

The throttle actuator control unit is provided with a control means which controls the actuator, when EGR control or DPF control has ended, so that the throttle valve turns toward the full open position in a longer period of time than the length of time in which the throttle valve is turned toward the full open position by the return spring only. The particulars of the control means is that places the actuator in a non-controlled state after performing control to hold the opening of the throttle valve in the vicinity of the full open point for a predetermined length of time.

Such a configuration makes it possible to increase reliability, eliminate damage to the motor or mechanical parts, and reduce mechanical collision noise and impact energy.

(19) In order to achieve the object stated above, an electronically controlled throttle apparatus comprising a throttle valve held rotatably in a throttle body; an actuator for driving the throttle valve; a return spring which gives a force to return the throttle valve in the full open direction; a throttle position sensor for detecting the opening of the throttle valve; and a throttle actuator control unit for driving the actuator based on the opening of the throttle valve detected by the throttle position sensor and a target opening.

The throttle body is equipped with a first gear fixed to the output shaft of the actuator, a second gear fixed to a throttle shaft supporting the throttle valve, and an intermediate gear which transmits a driving force for the second gear from the first gear. Further the apparatus is equipped with a washer, which is a wear-resistant member, between the intermediate gear and the throttle body supporting this intermediate gear.

DETAILED DESCRIPTION OF THE INVENTION

The configuration of an electronically controlled throttle apparatus (an electronic throttle apparatus) for diesel engines in the first embodiment of carrying out the present invention will be described below with reference to FIG. 1 through FIG. 15.

First, the system of the electronic throttle apparatus in the embodiment will be described with reference to FIG. 1.

Figure 1:
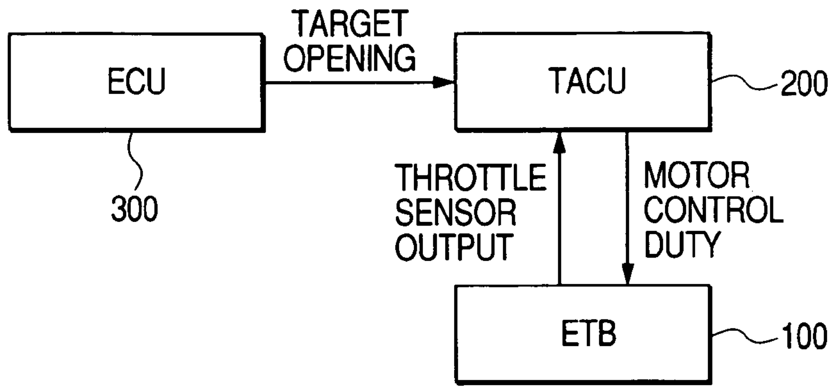
FIG. 1 shows the system of an electronically controlled throttle apparatus in the first embodiment of the present invention.

FIG. 1 shows the system of the electronic throttle apparatus in the first embodiment.

The electronic throttle apparatus is composed of an electronic throttle body (ETB) 100 and a throttle actuator control unit (TACU) 200. The electronic throttle body (ETB) 100 comprises a throttle valve rotatably held in a throttle body and an actuator, such as a motor, for driving this throttle valve. Its detailed configuration will be described afterwards with reference to FIG. 4 through FIG. 11.

The throttle actuator control unit (TACU) 200 controls the throttle valve of the electronic throttle body (ETB) 100 so that the opening thereof reaches to the target opening calculated by an engine control unit (ECU) 300. In response to the target opening from the ECU 300, the TACU 200 outputs a motor control duty signal for turning the throttle valve to the ETB 100. The opening of the throttle valve turned in response to this duty signal is detected by a throttle position sensor and sent to the TACU 200 as the throttle sensor output. The TACU 200, in a normal state of control, carries out a feedback control of the opening of the throttle valve so as to make the throttle sensor output equal to the target opening. The configuration and operation of the TACU 200 will be described afterwards with reference to FIG. 4 through FIG. 11.

Next, the opening of the throttle valve in the throttle apparatus of the embodiment will be explained with reference to FIG. 2 and FIG. 3.

Figure 2A:
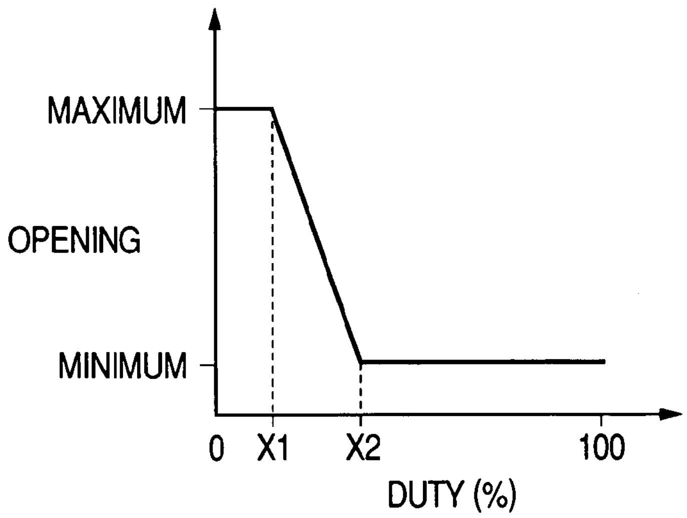
FIGS. 2A and 2B illustrate the throttle valve opening characteristics of the electronically controlled throttle apparatus in the first embodiment.
Figure 2B:
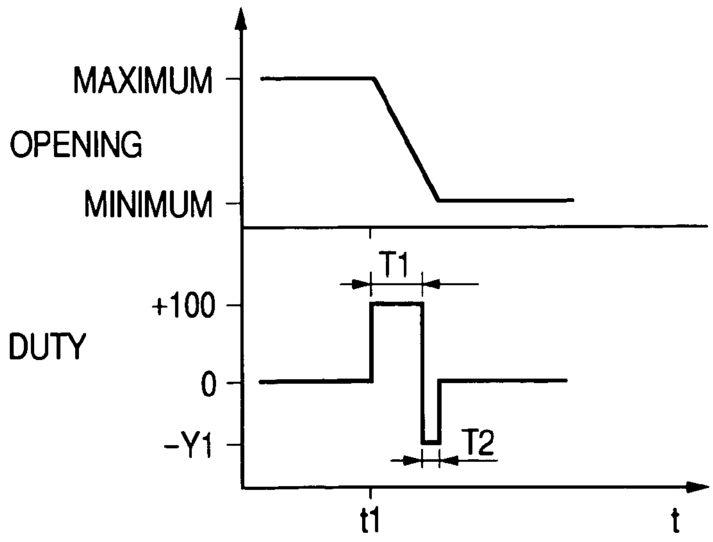

FIGS. 2A and 2B illustrate the throttle valve opening characteristics of the first embodiment. FIG. 2A illustrates the static characteristic of the opening of the throttle valve, and FIG. 2B, the dynamic characteristic of the opening of the throttle valve.

First, the static characteristic of the opening of the throttle valve will be explained with reference to FIG. 2A. In FIG. 2A, the horizontal axis represents the duty of a motor control duty signal sent from the TACU 200 to the ETB 100, and the vertical axis is the opening of the throttle valve. The throttle valve, as will be described afterwards, is given a force in the opening direction by a return spring. Therefore, when the duty is 0%, namely when no current is flowing to the motor, the opening of the throttle valve is at its maximum because the throttle valve is returned by the return spring in the opening direction.

While the duty is between 0% and X1%, a driving force for the throttle valve generates in the motor, but, as the motor driving force is smaller than the force of the return spring, the opening of the throttle valve is kept at its maximum. When the duty increases to between X1% and X2%, the driving force of the motor becomes greater than the force of the return spring, and the opening of the throttle valve gradually decreases toward its minimum, the opening of the throttle valve reaching its minimum at a duty of X2%. And when the duty increases beyond X2%, the opening of the throttle valve is kept at its minimum. The values of duties X1% and X2%, though varying with the force of the return spring and the driving force of the motor, may be, for instance, X1%=15% and X2%=30%. Therefore, if for instance a motor control signal involving a duty of 22.5% (=(15+30)/2) is given to the motor, the opening of the throttle valve will kept in an intermediate position between the maximum and the minimum.

The foregoing statement indicates the static relationship between the duty and the opening of the throttle valve. On the other hand, when the opening of the throttle valve is varied from one degree to another degree, the dynamic characteristic shown in FIG. 2B is used. The horizontal axis of FIG. 2B represents the time, the upper part of the vertical axis is the opening, and the lower part of the vertical axis is the duty. Here, when the opening of the throttle valve is to be varied from the maximum to the minimum, for instance, as shown in the upper part of FIG. 2B, a signal of a duty of 100% is outputted continuously for a duration of T1 from a point of time t1 as shown in the lower part of FIG. 2B, and the opening of the throttle valve is rapidly varied from the maximum toward the minimum. Then after the lapse of the duration of T1, a signal of a duty of −Y1% is outputted continuously for a duration of T2. The minus sign of the duty here means the direction of the current supplied to the motor is reverse and accordingly the motor is driven to turn in the reverse direction. Thus, the opening of the throttle valve is driven toward the minimum at high speed by supplying a signal of a duty of 100% and, after the lapse of the duration of T1, the target opening is rapidly reached by supplying a signal to reverse the turning direction of the motor and thereby to apply a brake. After that, feedback control is performed by varying the duty so that the output (the opening of the throttle valve) of the throttle sensor becomes equal to the target opening. The specific values of the durations T1 and T2 and −Y1%, though varying with the control system, may be T1=30 to 50 ms, −Y1%=−100% and T2=3 to 6 ms where, for instance, the shift is to be accomplished from the maximum opening to the minimum in a response time of 100 ms. The values of T1, T2 and Y1 are calculated by PID computation, and they are depend on the control constant of the PID computation.

Next, the definition of the opening of the throttle valve in the electronic throttle apparatus in the embodiment will be explained with reference to FIG. 3.

Figure 3:
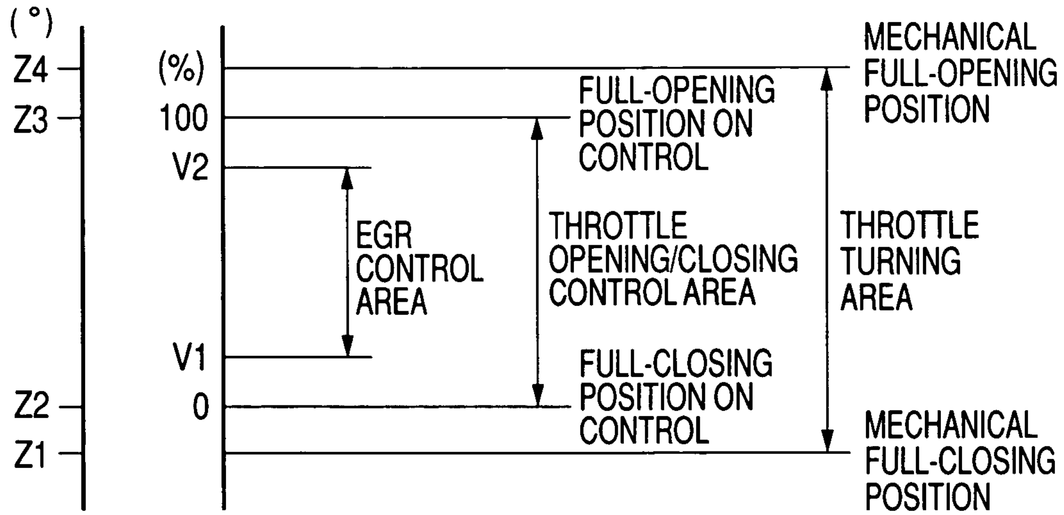
FIG. 3 illustrates the definition of the opening of the throttle valve in the electronically controlled throttle apparatus in the first embodiment.

FIG. 3 illustrates the definition of the opening of the throttle valve of the embodiment.

The opening of the throttle valve contains two different definitions, which are “the opening on control” and “mechanical opening position”. The opening described with reference to FIGS. 2A and 2B is the opening on control. The opening on control is controlled by the TACU 200, and the range from the minimum to the maximum opening is, for instance, 0 to 100%. 0% of the opening is the full closed state, and 100% thereof is full open state. The range from 0 to 100% is referred to as the throttle opening control area.

The ETB 100 has two stoppers for mechanically defining the opening of the throttle valve. The position in which the throttle valve is stopped by a stopper of the minimum opening side is the mechanical full closed position. The position in which the throttle valve is stopped by a stopper of the maximum side is the mechanical fully open position. The range between the mechanical full closed and mechanical full open positions is referred to as the throttle turning area. The throttle turning area is a wider range than the throttle opening control area as shown in FIG. 3.

Different openings in physical angles can be expressed in the following way, for instance. If the position where the throttle valve is at a right angle to the air flow is defined as 0°, the mechanical full closed position Z1 will be 6.5° for instance, and the full close on control will be Z2, 7° for instance. Further, the full open position Z3 will be 90° for instance, and the mechanical full open position Z4 will be 93° for instance.

Further, as shown in FIG. 3, an EGR control or DPF control area (V1 to V2) is in the throttle opening control area. Thus, when the target opening sent from the ECU 300 to the TACU 200 is within the range of V1 to V2, the TACU 200 can be judged to be performing EGR control or DPF control. In relation to the control area (0 to 100%), for instance, V1 is 10% and V2 is 80%.

Next, the configuration of the electronic throttle apparatus of the embodiment will be described with reference to FIG. 4 through FIG. 11.

Figure 4:
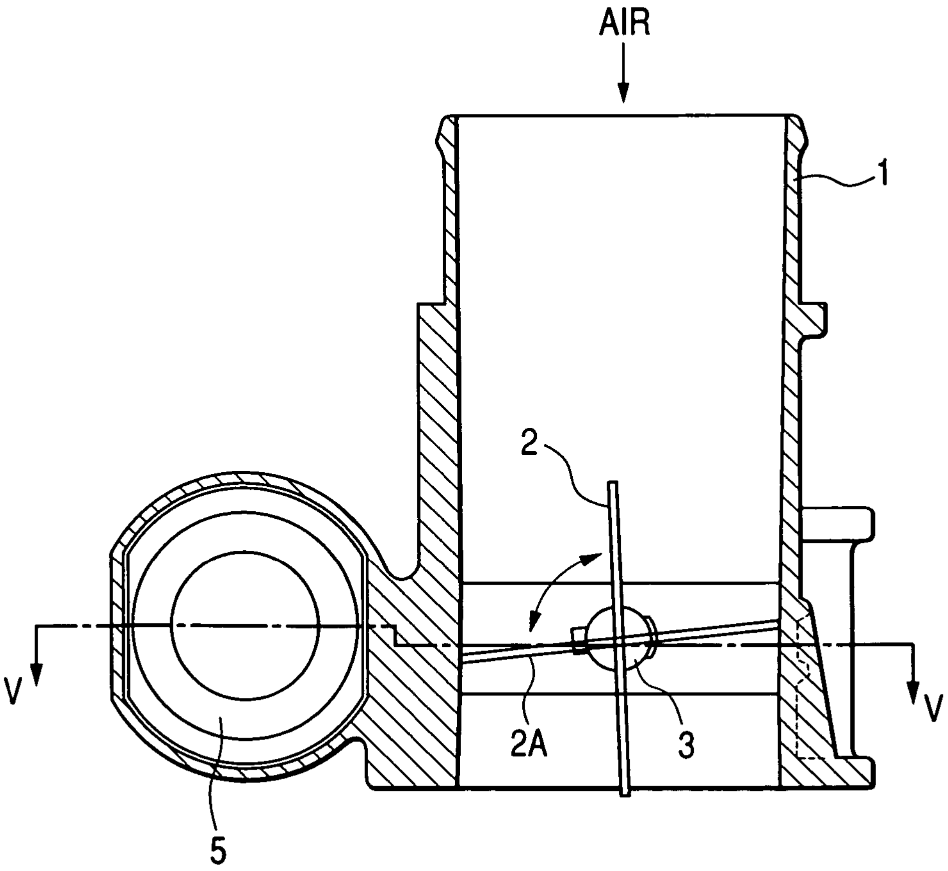
FIG. 4 is a vertical section of the electronically controlled throttle apparatus in the first mode of implementing the invention.
Figure 5:
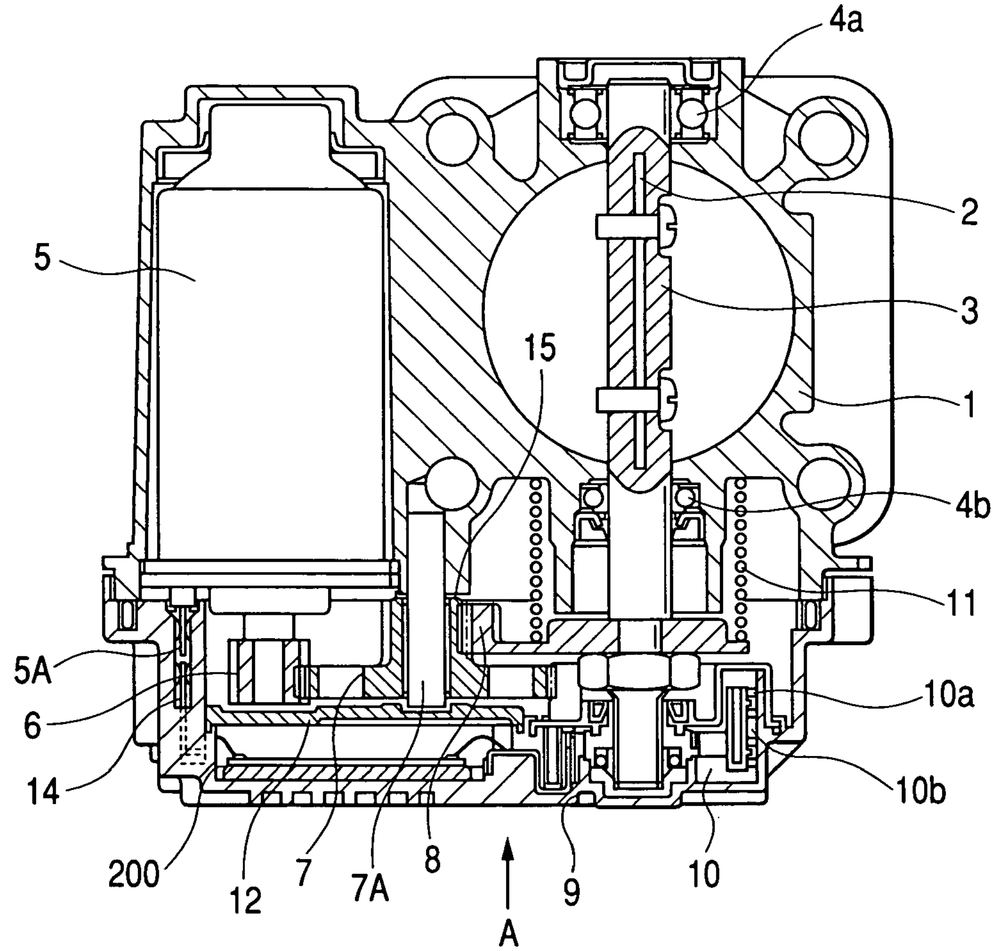
FIG. 5 is a section along the V—V arrow marked in FIG. 4.
Figure 6:
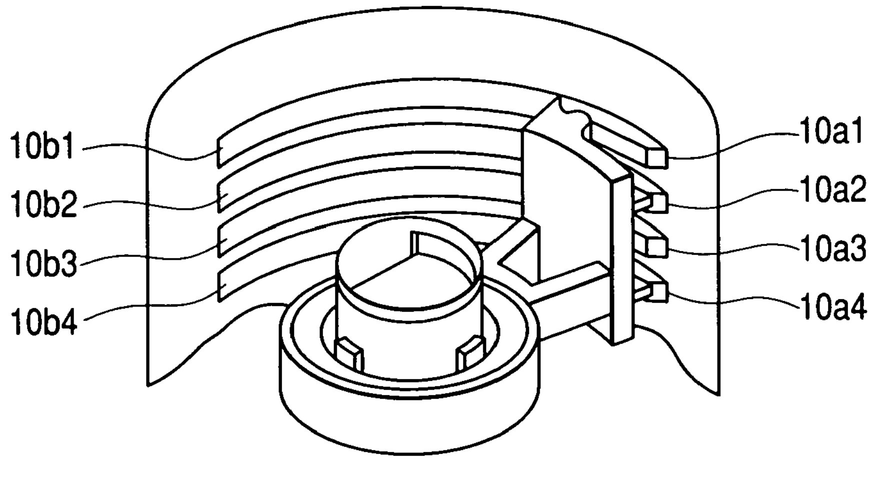
FIG. 6 is a perspective view of a throttle position sensor for use in the throttle apparatus.
Figure 7:
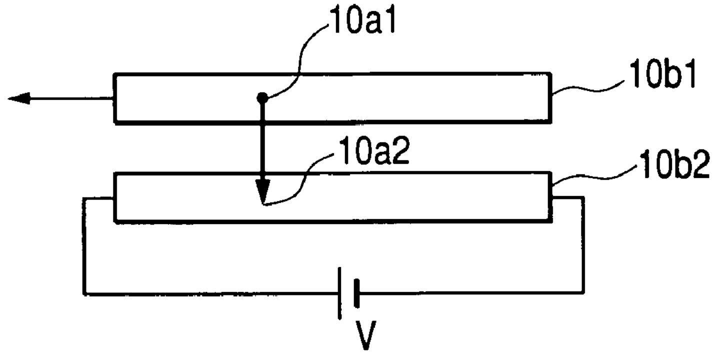
FIG. 7 is a circuit diagram of the throttle position sensor for use in the electronically controlled throttle apparatus in the first mode of implementing the invention.
Figure 8:
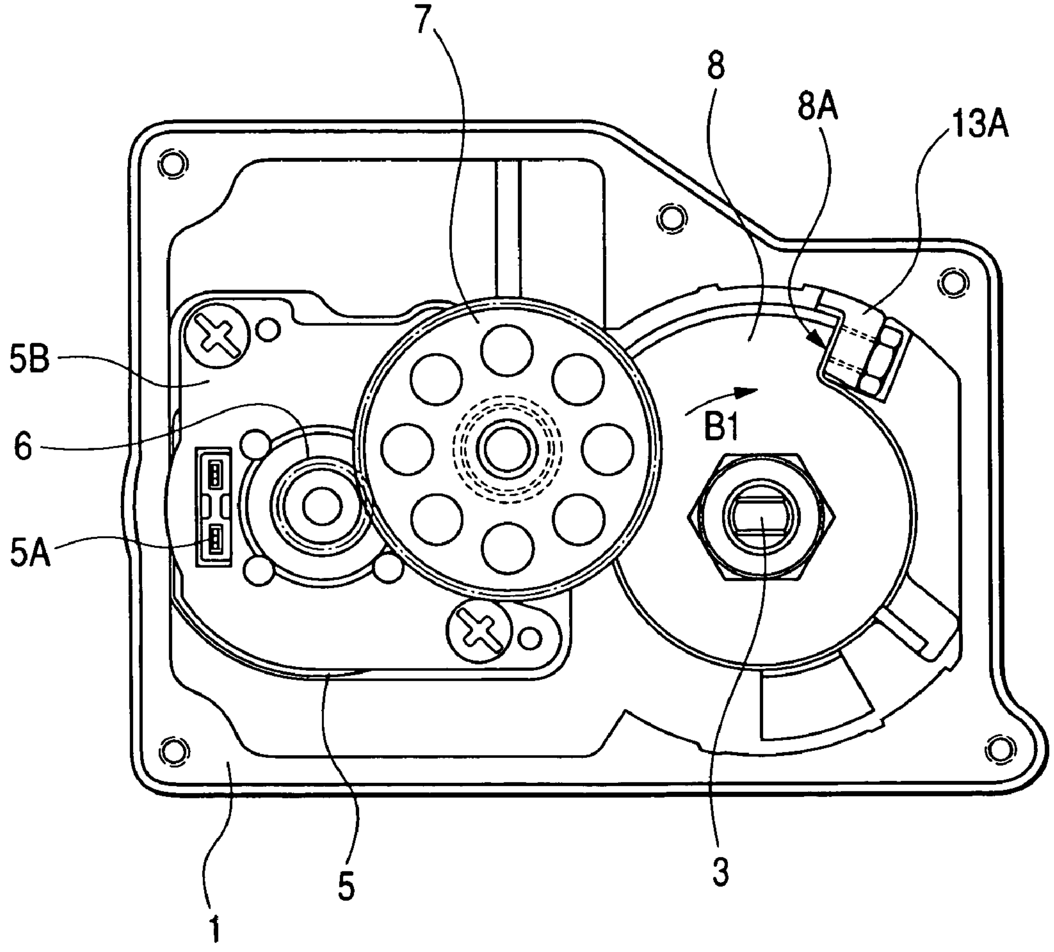
FIG. 8 is a view along the A arrow in FIG. 4 with the gear cover taken off.
Figure 9:
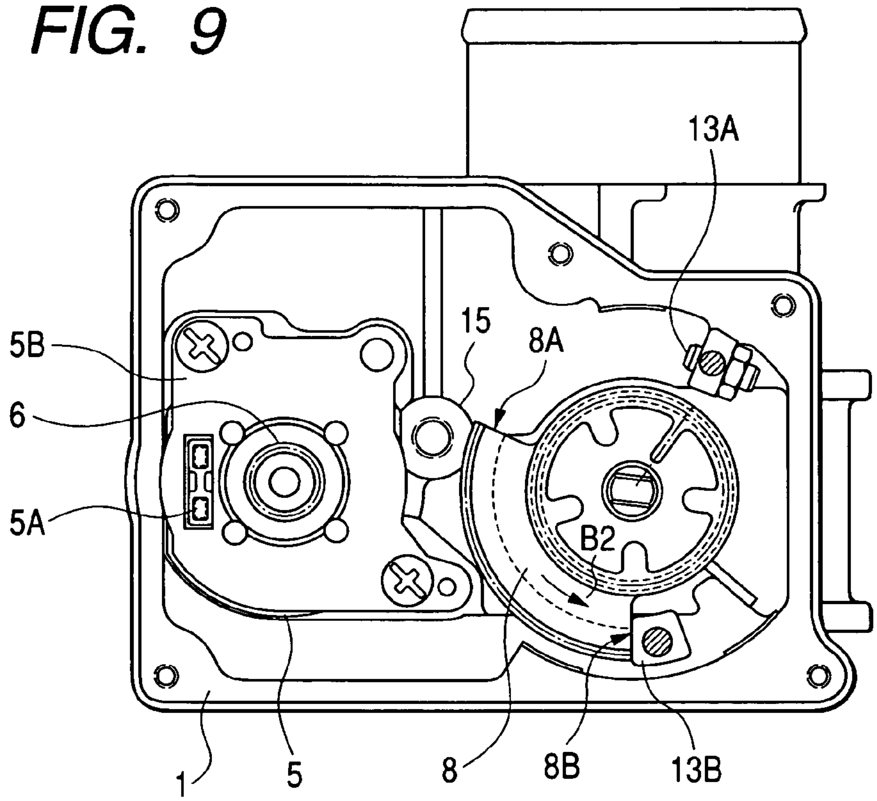
FIG. 9 is a view along the A arrow in FIG. 4 with the gear cover taken off.
Figure 10:
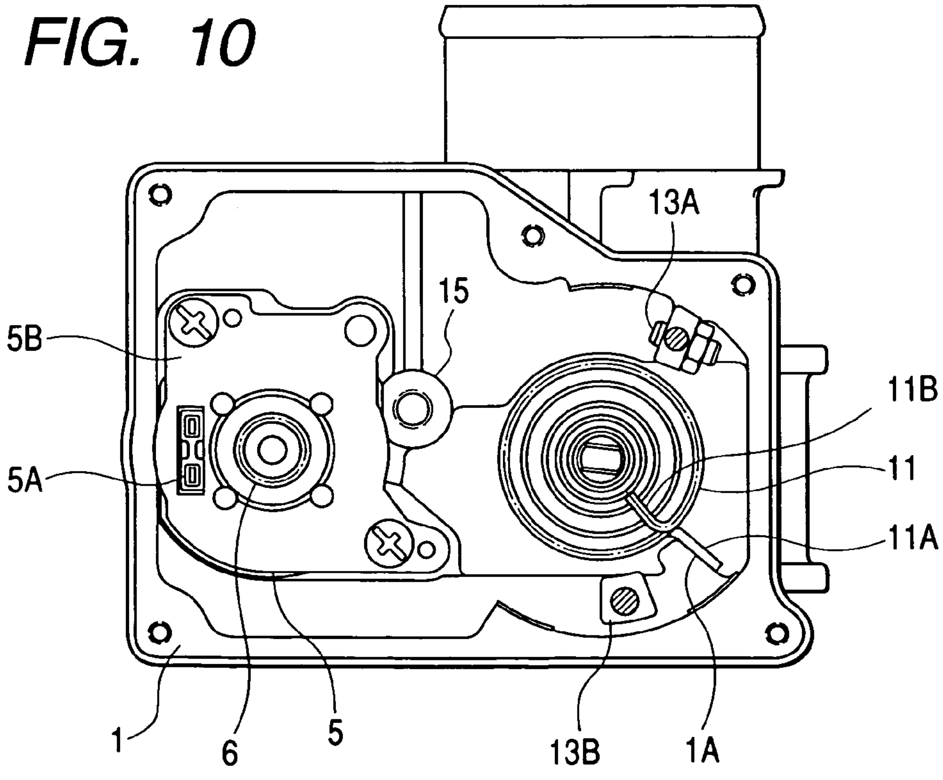
FIG. 10 is a view along the A arrow in FIG. 4 with the gear cover taken off.
Figure 11:
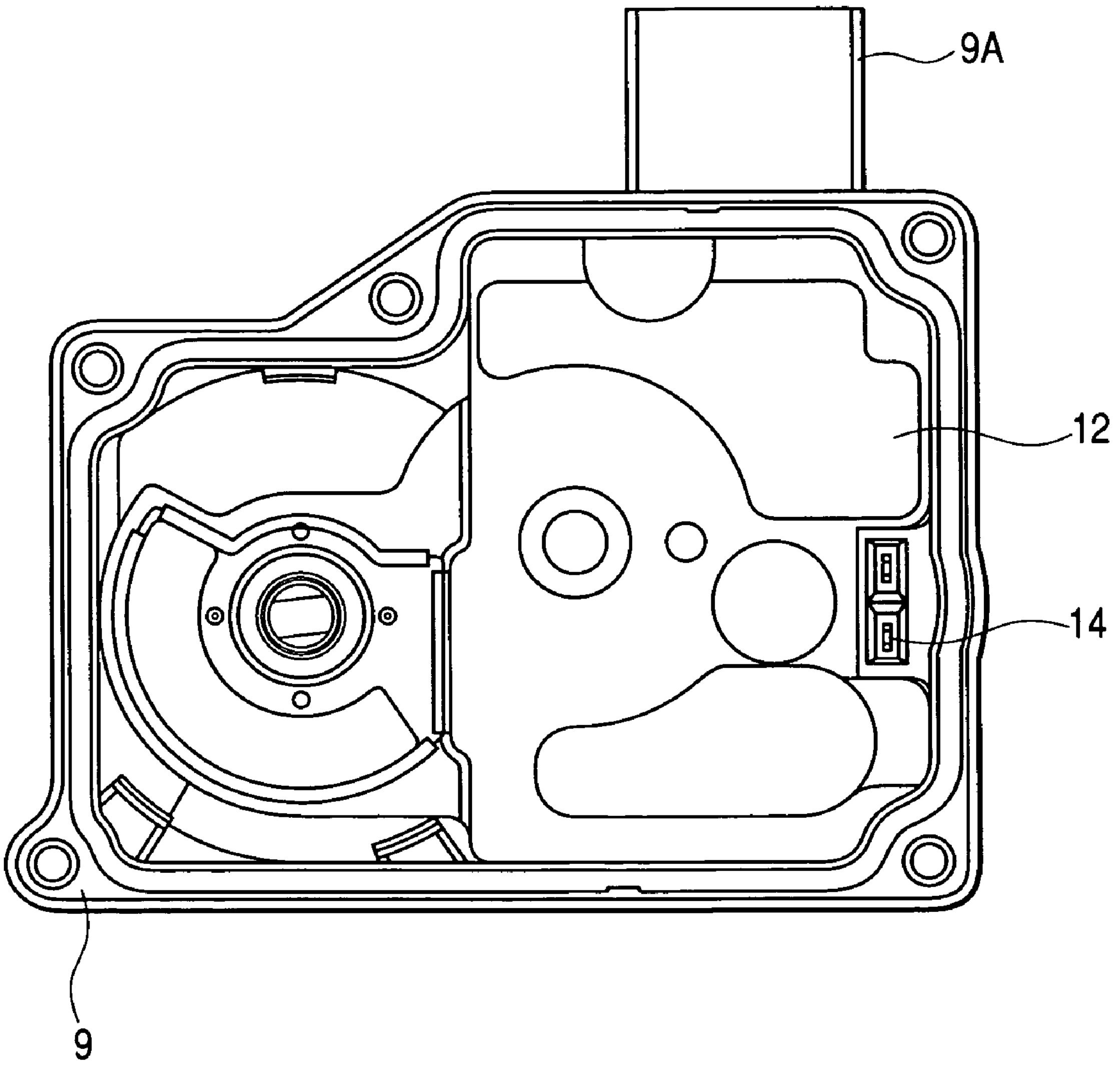
FIG. 11 is a plan of the gear cover for use in the electronically controlled throttle apparatus in the first mode of implementing the invention.

FIG. 4 shows a vertical section of the electronic throttle apparatus of the first embodiment the invention. FIG. 5 shows a section along the V—V arrow marked in FIG. 4. FIG. 6 shows a perspective view of a throttle position sensor for use in the electronic throttle apparatus in the first embodiment. FIG. 7 is a circuit diagram of the throttle position sensor for use in the electronic throttle apparatus. FIG. 8, FIG. 9 and FIG. 10 show views along the A arrow in FIG. 4 with the gear cover taken off. FIG. 11 shows a plan of the gear cover for use in the electronic throttle apparatus. In these drawings, the same signs denote respectively the same parts.

As shown in FIG. 4, a throttle body 1 has an air passage and also is equipped with various constituent parts. An intake air flows into the air passage downward from the top in the direction of the arrow AIR. The throttle body 1 is made of die-cast aluminum for instance. A throttle valve 2 is fixed to a throttle shaft 3 with screws or the like. The throttle shaft 3 is rotatably held by bearings to the throttle body 1. In the state in which no duty is provided to the motor, as shown in sign 2A of FIG. 4, the throttle valve 2 is held in the mechanical full open position by the force of a return spring. A DC motor 5 is housed in a space within the throttle body 1 and fixed there. The driving force of the DC motor 5 is transmitted to the throttle shaft 3 via a gear not shown, and turns the throttle valve 2.

Next, as shown in FIG. 5, the throttle shaft 3 is rotatably held by ball bearings 4*a* and 4*b* in the throttle body 1. A gear 8 is fixed to the throttle shaft 3. Between the gear 8 and the throttle body 1, a return spring 11 is held. The return spring 11 supplies a force to the gear 8 and the throttle shaft 3 so that throttle valve 2 can move in the full open direction.

The DC motor 5 is located in parallel with the throttle body 1. A gear 6 is fixed to the output shaft of the motor 5. A gear 7 is rotatably held by a shaft 7A fixed to the throttle body 1. Gears 6, 7, and 8 are meshed with one another, and the driving force of the motor 5 is transmitted to the throttle shaft 3 via the gears 6, 7, and 8. The flow rate of intake air to the engine is controlled by controlling the turning position of the throttle valve 2 electronically.

The throttle actuator control unit (TACU) 200 is held by a gear cover 9. A control unit cover 12 is fixed to the gear cover 9, resulting in a structure not to allow moisture or the like to adhere to the TACU 200. The gear cover 9 is made of molded resin, and a connector terminal 14 is molded integrally with it. One end of the connector terminal 14 is electrically connected to the TACU 200. By attaching the gear cover 9 to the throttle body 1, the other end of the connector terminal is connected with the motor terminal 5A of the motor 5 via a joint, thereby the TACU 200 and the motor 5 electrically connect to each other. When a duty signal is given from the TACU 200 to the motor 5, the DC motor 5 generates a rotational force.

A throttle position sensor 10 for detecting the position of the throttle valve 2 comprises a brush 10*a* which is a movable element and a resistor 10*b* which is a stationary part. The brush 10*a* is structured integrally with the throttle valve 2 by being fitted onto the throttle shaft 3. The resistor 10*b* is incorporated into the gear cover 9. By contacting of the brush 10*a* and the resistor 10*b*, the position of the throttle valve 2 is converted into a voltage, which is outputted to a control unit 12.

The configuration of throttle position sensors 10 will now be described with reference to FIG. 6 and FIG. 7. As shown in FIG. 6, the throttle position sensors 10 are comprised of four brushes 10*a*1, 10*a*2, 10*a*3, and 10*a*4 and four resistors 10*b*1, 10*b*2, 10*b*3, and 10*b*4. The brushes 10*a*1, 10*a*2 and the resistors 10*b*1, 10*b*2 compose a first throttle position sensor, and the brushes 10*a*3, O*a*4 and the resistors 10*b*3, 10*b*4 compose a second throttle position sensor. This embodiment has a configuration of throttle position sensors for a gasoline engine system, i.e. two lines of throttle position sensors, but the configuration is such that only one out of the two lines is used for a diesel engine.

As shown in FIG. 7, in one of the throttle position sensors, the brushes 10*a*1 and 10*a*2 slidably contact with the resistor 10*b*1 and 10*b*2. A DC voltage from a power source V is supplied V at the both ends of the resistor 10*b*2. The position of the brush 10*a*, namely the position of the throttle valve 2 can be detected as a voltage signal by detecting a voltage of the resistor 10*b* 1.

The TACU 200 performs a feedback control in usual state so that the output of the throttle position sensor 10 becomes equal to a target value equivalent to the target opening of the throttle valve.

A washer 15 is provided between the gear 7 and the throttle body 1. The washer 15 consists of a wear-resistant plastic material, such as PA66 nylon containing molybdenum for instance. In a state in which no electric power is supplied to the motor 5, the motor 5 generates no driving force. In this state, the throttle valve 2 is kept in the mechanical full open position by the return spring 11. Further the gear 6 and the gear 8 are in a state of being rigidly fixed to the motor shaft and the throttle shaft 3, respectively, and the gear 7 is put on a shaft 7A in a free state. As the throttle apparatus of the embodiment is mounted on a vehicle, when the gear 7 is in such a free state, if supposing there is no consideration for the gear 7, the gear 7 will be oscillated in the thrust direction of the shaft 7A by the vibration of the vehicle. Therefore, an end face of the gear 7 is struck against the throttle body 1, thereby at least one of an abnormal noise, damage or wear generates in the throttle body 1. Incidentally, the throttle body 1 is made of die-cast aluminum, while the gears are made of a sintered alloy, which is stronger than aluminum. Therefore, in order to prevent the oscillation which is the cause of the abnormal noise and damage etc., the washer 15 made of a wear-resistant plastic material is provided.

FIG. 8 shows a view along the A arrow with the gear cover 9 in FIG. 5 taken off. The motor 5 is fixed by screwing a motor fixing plate 5B to the throttle body 1. The power supply terminal 5A of the motor 5 protrudes from a hole in the plate 5B.

A mechanical full closed stopper 13A is provided to the throttle body 1 in the vicinity of the gear 8. When a signal of a 100% duty is supplied to the motor 5, the gear 8 turns in the direction of an arrow B1 (←: the closing direction of the throttle valve 2), and a stopper end 8A formed on the gear 8 comes into contact with the mechanical full closed stopper 13A. In this state, the throttle valve kept in the mechanical full open position.

In the electronic throttle apparatus for diesel engines, if any abnormality arises in the DC motor 5 or throttle position sensor 10 or the like, it is detected by the control unit 12. And, the control unit immediately cuts off power supply to the DC motor 5 or holds the control duty to 0%, thereby the throttle valve returns to the mechanical full open position 13B by the force of the only return spring 11 working in the opening direction.

FIG. 9 shows a state in which the gear 7 has been removed from the state shown in FIG. 8. The gear 8 has a shape of about ⅓ of a circle. One end of the gear 8 functions as a stopper end 8A, and the other end also functions as a stopper end 8B.

A mechanical full open stopper 13B is provided at a position close to the gear 8 in the throttle body 1. Unless a duty signal or a voltage is supplied to the motor 5, the stopper end 8B will be brought into contact with the mechanical full open stopper 13B by the force of the return spring 11 working in the opening direction, and the throttle valve 2 will be kept in the mechanical full open position.

Namely in a state in which no duty is supplied to the motor 5, the throttle valve 2 remains being held in the mechanical full open position.

FIG. 10 shows a state in which the gear 8 has been removed from the state shown in FIG. 9. Only one return spring 11 is used. One end 11A of the return spring 11 is caught on a part 1A of the throttle body 1, while the other end 11B is caught on the gear 8 to give a force of the opening direction to the throttle valve 2.

FIG. 11 is a plan of the gear cover 9. The gear cover 9 is provided with the connector terminal 14. Also, the gear cover 9 is provided with a connector 9A for connection to the ECU 300 or an external power supply source, and its internal terminal is connected to the TACU 200.

Next, the system of the throttle actuator control unit (TACU) 200 of the embodiment will be described with reference to FIG. 12.

Figure 12:
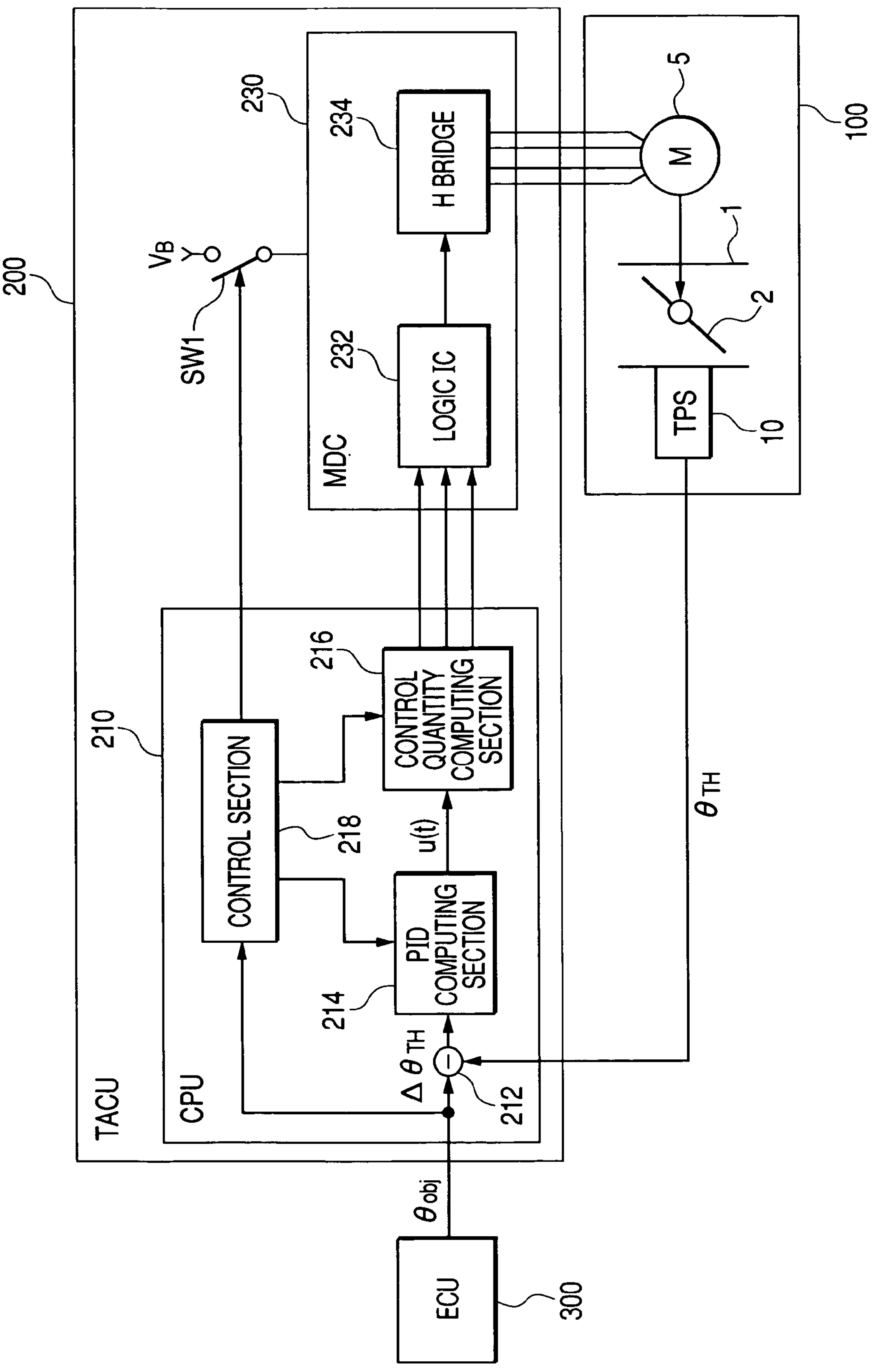
FIG. 12 shows the system configuration of the throttle actuator control unit (TACU) of the electronically controlled throttle apparatus in the first mode of implementing the invention.

FIG. 12 shows the system of the throttle actuator control unit (TACU) in the first embodiment of the invention. Incidentally, the same signs in FIG. 1, FIG. 4 and FIG. 5 denote respectively the same parts.

The throttle actuator control unit (TACU) 200 is comprised of a CPU 210 and a motor drive circuit (MDC) 230. The CPU 210 is composed of a difference computing section 212, a PID computing section 214, a control quantity computing section 216, and a control section 218.

The difference computing section 212 computes an opening difference Δθth of the target opening θobj outputted by the ECU 300 and the actual opening θth of the throttle valve outputted by the throttle position sensor 10. The PID computing section 214 computes a PID control quantity u(t) on the basis of the opening difference Δθth outputted by the difference computing section 212. The PID control quantity u(t) calculated by the PID computation is obtained as $(KP\cdot\Delta\theta th+Kd\cdot(d\Delta\theta th/dt)+Ki\cdot\Sigma\Delta\theta th\cdot dt)$. Kp is a proportional constant, Kd is a differential constant, and Ki is an integral constant.

The control quantity computing section 216 selects, on the basis of the PID control quantity u(t), an on/off switch of an H bridge circuit 234 to be described later, thereby determining the direction in which the current flows. It also determines the duty to turn on and off the switch of the H bridge circuit 234, and outputs it as the control quantity signal.

The control section 218, as will be described in detail with reference to FIG. 14, determines whether or not EGR control or DPF control is being performed on the basis of the target opening θth. And, if neither EGR control nor DPF control is performed, it will perform a control for fully opening the throttle valve. As required, it also controls the opening or closing of a switch SW1 for supplying a voltage VB to the PID computing section 214, the control quantity computing section 216, and the MDC 230.

The motor drive circuit (MDC) 230 is provided with a logic IC 232 and the H bridge circuit 234. The logic IC 232 outputs on/off signals to the four switches of the H bridge circuit 234 on the basis of the control quantity signal outputted by the control quantity computing section 216. The switches of the H bridge circuit 234 are opened or closed in response to on/off signals, and causes the motor 5 to turn forward or backward by supplying a required current to the motor 5.

Next, the configuration of the H bridge circuit 234 to be used in the electronic throttle apparatus will be described with reference to FIG. 13.

Figure 13:
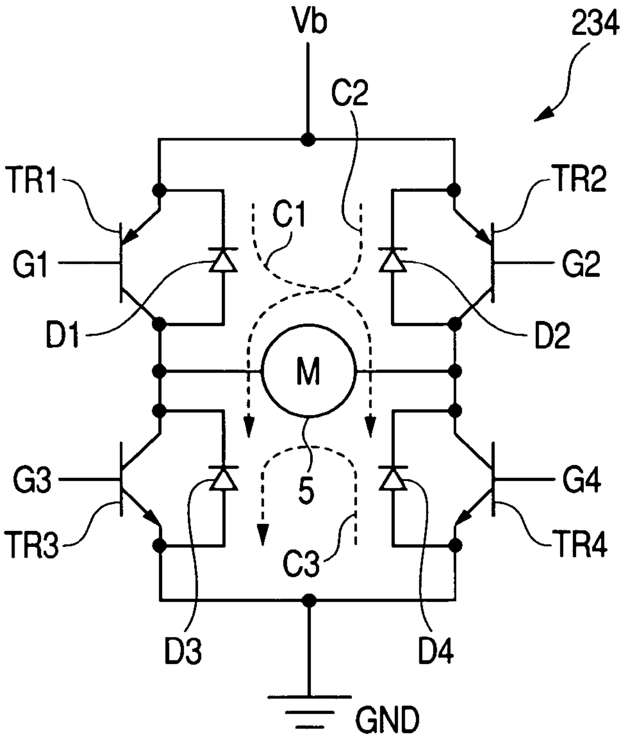
FIG. 13 is a circuit diagram showing the configuration of the H bridge circuit to be used in the electronically controlled throttle apparatus in the first mode of implementing the invention.

FIG. 13 is a circuit diagram showing the configuration of the H bridge circuit.

The H bridge circuit 234, in which four transistors TR1, TR2, TR3, and TR4 and four diodes D1, D2, D3, and D4 are connected as illustrated, makes a current flow to the motor 5. For instance, when a gate signal G1 and a gate signal G4 rise to a high level and the transistors TR1 and TR4 are turned on, a current flows as indicated by a broken line C1. In this state, for instance, the motor 5 turns in the forward direction. Also, when a gate signal G2 and a gate signal G3 rise to a high level and the transistors TR2 and TR3 are turned on, a current flows as indicated by a one-dot chain line C2. Then, for instance, the motor 5 turns in the backward direction.

Further, when the gate signal G3 and the gate signal G4 rise to a high level and the transistors TR3 and TR4 are turned on, a current is enabled to flow as indicated by a two-dot chain line C3. In this state, when a driving force is transmitted from outside to the drive shaft of the motor 5, as the rotor of the motor 5 turns, the motor 5 operates as a generator, and it is enabled to perform regenerative braking. Incidentally, if the transistors TR1 and TR2 are turned on continuity at the same time, it will still be possible to have the motor 5 perform regenerative braking.

Incidentally, this embodiment is a case in which a one-chip microcomputer formed by integrating an H bridge circuit is used, and it can freely control the turning on and off of transistors by giving digital signals to a logic IC. In this embodiment, however, as the purpose can be achieved if the state of the motor drive circuit can be controlled, the H bridge itself may be configured either of four transistors or of an integrated one-chip IC.

Next, control actions by the control section 218 will be described with reference to FIG. 14 and FIG. 15.

Figure 14:
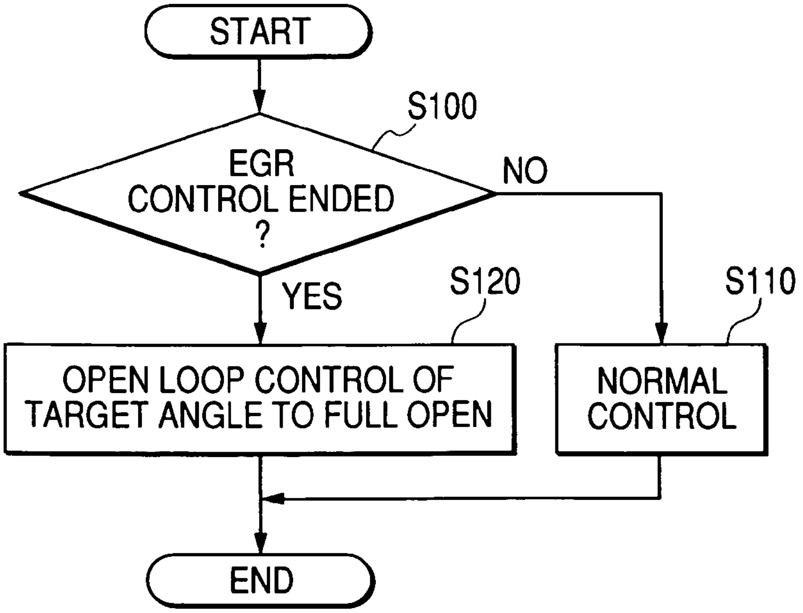
FIG. 14 is a flow chart showing the particulars of controls by the control section of the electronically controlled throttle apparatus in the first mode of implementing the invention.

FIG. 14 is a flow chart showing the contents of controls by the control section of the first embodiment. FIG. 15 is a time chart showing the contents of controls by the control section.

At step s100, the control section 218 determines whether or not EGR control or DPF control has ended. If not, it will continue usual feedback control at step s110. If it has, the control section will execute at step s120 target angle control until full open.

Here, in the determination at step s100, the control section 218 uses the target opening received from the ECU 300 to determine whether or not EGR control or DPF control has ended. For instance, if the throttle opening control area is in the range of 0 to 100% as described with reference FIG. 3, the EGR control or DPF control area will be the range of (V1 to V2) (e.g. 10 to 80%). Therefore, if the target opening received from the ECU 300 is within the range of 10 to 80%, the control section 218 will judge that EGR control or DPF control is being performed and the target opening control for the range of 0 to 10% has ended. If the target opening is 80 to 100%, the control section 218 will can recognize that by judging whether or not an end flag of the EGR control or DPF control has been received from ECU 300.

Next, a target angle control for the full open at step s120 will be described with reference to FIG. 15. In FIG. 15, the horizontal axis represents time t. The vertical axis represents the throttle opening (controlled opening) θth and the motor duty Du. Concerning the throttle opening θth, the closer one to the origin is the full close side of the throttle valve. As the throttle opening θth goes away from the origin, it comes close to the full open state. Concerning the motor duty Du, the closer one to the origin is close to the duty 100%. As the duty Du goes away from the origin, it comes close to 0%.

Figure 15:
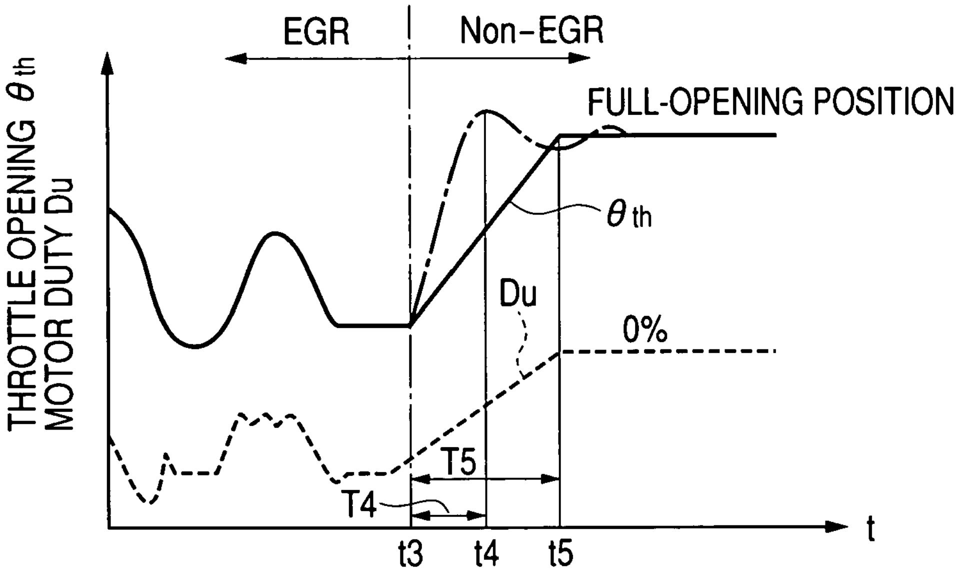
FIG. 15 illustrates the particulars of controls by the control section of the electronically controlled throttle apparatus in the first mode of implementing the invention.

In the diagram of FIG. 15, the solid line θth represents variations of the throttle opening, and the broken line Du is the duty provided to the motor. The range until a point of time t3 from time O represents a state in which EGR control or DPF control is being performed, and the range beyond the point of time t3 is a state in which EGR control or DPF control has ended. In the range beyond the point of time t3, the solid line θth represents variations of the throttle opening in a case in which the duty control of the embodiment of the invention has been performed, while the one-dot chain line represents variations of the throttle opening in a case in which control of the embodiment has not been performed.

Until the point of time t3, EGR control or DPF control is performed by the processing at step s110. According to a target opening θobj received from the ECU 300, the duty Du provided to the motor varies, and the throttle opening θth also varies correspondingly.

When it is determined at the point of time t3 that EGR control or DPF control has ended, power supply to the motor will be interrupted if control of the embodiment is not performed. This causes a state of a 0% duty. As a result, the throttle valve is rapidly turned to the full open side by the force of the return spring as indicated by the one-dot chain line. Then, stopper 8A of the throttle valve side comes into contact with the full open stopper 13A at a point of time t4 and, after repeating rebounding from the stopper 13A and pulling back by the return spring, finally stops in the controlled full open position. A period T4 from the point of time t3 until the point of time t4 is, for instance, 150 ms. If the throttle valve is pulled back by the return spring with such a high speed, the stopper 8A will clash with the full open stopper 13A, inviting the occurrence of collision noise and an effect of the impact load to shorten the service life of mechanical parts.

On the other hand, according to the target angle (the target opening of the throttle valve) open loop control until the full open in the embodiment of the invention, the control section 218 outputs, to the control quantity computing section 216 a, control signal for causing the duty to gradually decrease. The decreasing is from the duty level at the point of time when EGR control or DPF control is determined to have ended (the point of time t3) to a duty of 0% at a point of time t5 as indicated by the motor duty Du. The control quantity computing section 216 outputs to the logic IC 232 a control signal which causes the duty to gradually decrease from its level at the point of time t3 to a duty of 0% at the point of time t5. As a result, the motor is turned according to a duty signal represented by the broken line Du in the diagram. As a result, as represented by the solid line in the diagram, the throttle opening θth gradually shifts from the angle at the point of time when EGR control or DPF control is determined to have ended (the point of time t3) toward the full open side, and becomes the full open state at the point of time t5. By decreasing the duty signal gradually so that a period T5 from the point of time t3 until the point of time t5 becomes 500 ms for instance, the speed of the pull-back of the throttle valve at the time when the gear 8 clashes with the full open stopper 13A is reduced. Thereby, it is possible to prevent from the occurrence of collision noise and shortening of the service life of mechanical parts caused by the impact load.

By setting the way of providing the motor drive duty under open loop control as described above, the response for shifting the throttle valve to the full open position is slower than that by only the spring force working in the full open direction (T4<T5). Accordingly the noise by collision of the full open stopper and motor drive gears, and the impact energy can be reduced. Further, in the case of control under which a preset predetermined value is applied to the motor for any arbitrary duration as described in the Japanese Patent Laid-Open No. 2003-214196, dispersions in response time and other factors from one individual product to another cannot be absorbed. In this case, even though the throttle valve returns to the full open position, control to keep the motor running may continue to be performed, involving a risk of damaging the motor with an excess current. Unlike that, this embodiment is free from the problem that control continues even though the throttle valve returns to the position of the full open stopper.

The control section 218 controls the throttle opening by an open loop system of providing a duty serving as the target. The way the duty is provided under this open loop control may follow a linear formula of straight decrease as shown in FIG. 15 for instance, or in a parabolic form or the like. If the response is eventually made slower than when pulled back by only the return spring 11, the noise by collision of the gear 8 and the full open stopper 13, and the impact load can be reduced.

As described above, according to the embodiment, when it is judged that EGR control or DPF control has ended and the throttle valve is to be shifted to the full open position, the duty provided to the motor is gradually decreased. Therefore, the speed of collision of the gear and the full open stopper can be slowed down to make it possible to prevent the occurrence of collision noise and an effect of the impact load to shorten the service life of mechanical parts.

Next, the control operation by the control section 218 of an electronic throttle apparatus in the second embodiment of the invention will be described with reference to FIG. 16 and FIG. 17.

The system of the electronically controlled throttle apparatus (electronic throttle apparatus) in this embodiment is similar to what is shown in FIG. 1. Also, the configuration of the electronic throttle apparatus is similar to what is shown in FIG. 4 through FIG. 11. Further, the system of the throttle actuator control unit (TACU) 200 of the embodiment is similar to what is shown in FIG. 12. Also, the configuration of the H bridge circuit 234 for use in the electronic throttle apparatus is similar to what is shown in FIG. 13.

Figure 16:
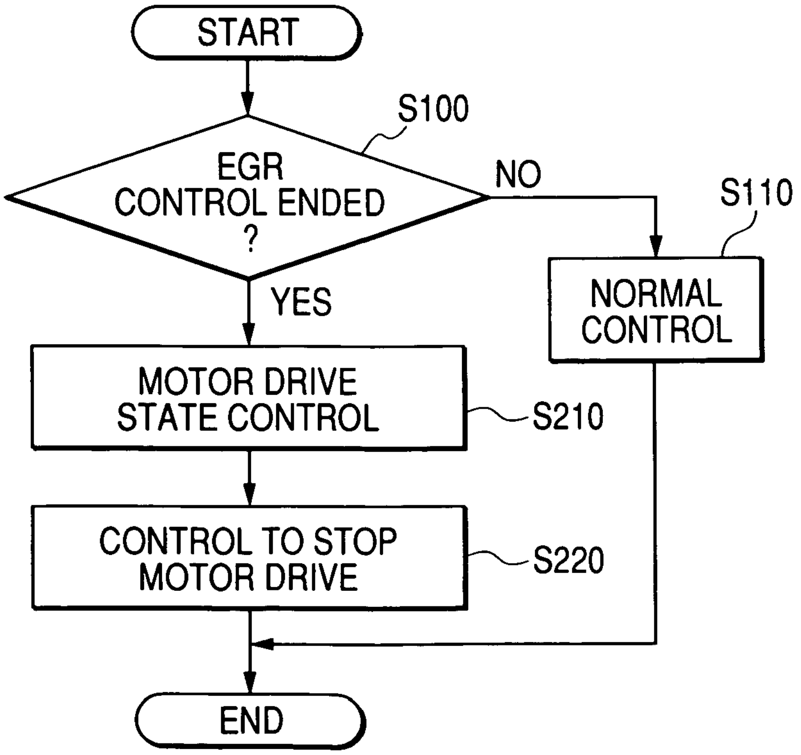
FIG. 16 is a flow chart showing the particulars of controls by the control section of the electronically controlled throttle apparatus in a second mode of implementing the invention.

FIG. 16 is a flow chart showing the contents of controls by the control section of the electronic throttle apparatus in the second embodiment. FIG. 17 illustrates the time chart of controls by the control section. The same step numbers as in FIG. 14 denote respectively the same control contents.

Figure 17:
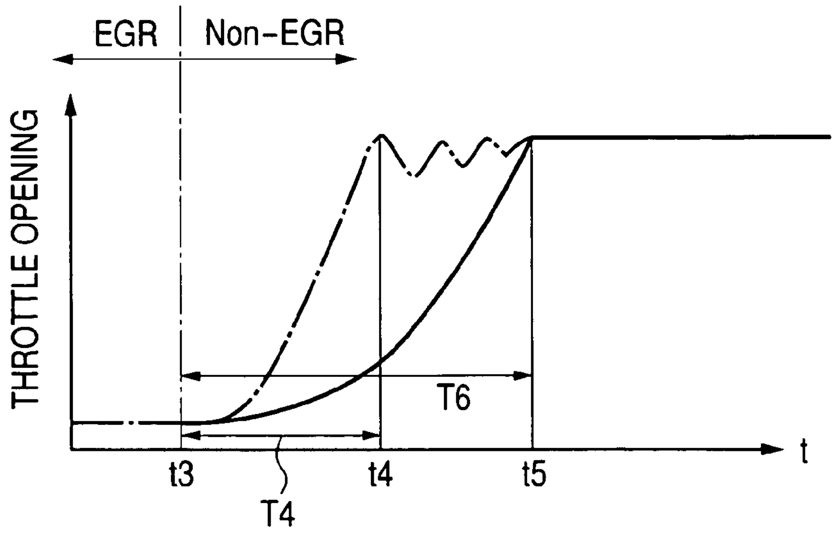
FIG. 17 illustrates the particulars of controls by the control section of the electronically controlled throttle apparatus in the second mode of implementing the invention.

In FIG. 17, the horizontal axis represents time t. The vertical axis represents the throttle opening (controlled opening) θth. The closer one to the origin is the full close side of the throttle valve. As the throttle opening θth goes away from the origin, it comes close to the full open state.

At step s100, the control section 218 determines whether or not EGR control or DPF control has ended. If not, usual feedback control will be continued at step s110. If it has, the control section will perform at step s210 a control of the motor drive state and next at step s220 a control to stop the motor drive. The process from step s100 through s220 is repetitively executed in, for instance, 3 ms cycles.

In the processing at step s210, the control section 218 outputs, to the control quantity computing section 216, a control signal which causes the motor 5 to perform regenerative braking. As described with reference to FIG. 13, when an "on signal" is supplied to gates G3 and G4 of the transistors TR3 and TR4, if the motor 5 turns, a current will flow in the direction of arrow C3, and the motor 5 will perform regenerative braking.

So the control section 218 outputs, to the control quantity computing section 216, a control signal for turning on the transistors TR3 and TR4. The control quantity computing section 216 outputs, to the logic IC 232, a control signal for turning on the transistors TR3 and TR4. At this time, the throttle valve 2 is caused by the return spring 11 to move in the full open direction. As the motion of the throttle shaft is transmitted to the motor 5 via the gears 8, 7, and 6, the motor 5 performs regenerative braking. This regenerative braking by the motor 5 gives a brake on the motion of the throttle valve in the full open direction.

What is important here is as follows. The force given by the return spring 11 causes the motor to turn in the full open direction via a gear mechanism when power supply to the motor is turned off; the on/off states of the transistors of the H bridge circuit are controlled so that the H bridge is connected electrically with the motor circuit to generate the regenerative braking which works in the opposite direction against the forces given by the return spring 11. Under this control, the throttle valve 2 slowly moves as at the time of connecting the motor drive circuit as shown in FIG. 17, thereby the invention prevents the gear 8 and the full open stopper from abruptly colliding against each other.

Then, at step s220, the control section 218 outputs, to the control quantity computing section 216, a control signal to stop the driving of the motor. Thus, the control section 218 outputs, to the control quantity computing section 216, the control signal which causes the duty Du given to the motor to reduce to 0%. The control quantity computing section 216 outputs, to the logic IC 232, the control signal which causes the duty to 0%. Since power supply to the motor is interrupted as a result, the throttle valve 2 is caused by the return spring 11 to shift in the full open direction.

The motor drive stop control may as well turn off power supply to the motor 5. To do so, the control section 218 turns off a switch SW1 shown in FIG. 12 to stop power from the power source VB being supplied to the motor 5 via the motor drive circuit 230. As described so far, under the motor drive stop control, power supply to the motor is interrupted to stop driving the motor by reducing the duty Du given to the motor to 0% and thereby turning off the transistors of the H bridge circuit or turning off the switch provided on the way of the power supply path from the power source to the motor.

Thus, the motion in the full open direction is momentarily braked by the processing at step s210, and the processing at the next step s220 releases the brake to allow the motion in the full open direction to be caused by the return spring. As the processing from step s100 through s220 is repeated in 3 ms cycles for instance, when EGR control or DPF control is determined to have ended, breaking at step s210 and control without brake at step s220 are repeated, and the throttle valve moves gradually toward the full open side, eventually reaching the fully open point at a point of time t6 for instance.

In the diagram, while the period T4 is similar to what is shown in FIG. 15, during which the throttle opening is not at all braked, a period T6 from the point of time t3 until the point of time t6 in this embodiment is made longer than the period T4 by cyclic braking on the way. The speed at the time of collision of the gear 8 and the full open stopper 13A, when the throttle valve is pulled back to the full open point, is reduced, making it possible to prevent the occurrence of collision noise and an effect of the impact load to shorten the service life of mechanical parts.

As described above, in this embodiment, when it is determined that EGR control or DPF control has ended and the throttle valve is shifted toward the full open position, first providing from the control section of the CPU a signal to cause the motor to generate regenerative braking. As the braking works in a reverse direction against the spring force working toward the full open position, the impact energy that occurs when the full open stopper and gears or other constituent parts of the motor drive mechanism clash with each other can be reduced, making it possible to prevent the occurrence of collision noise and an effect of the impact load to shorten the service life of mechanical parts.

Next, the control operation by the control section 218 of an electronic throttle apparatus in the third embodiment of the invention will be described with reference to FIG. 18.

The system of the electronic throttle apparatus in this embodiment is similar to what is shown in FIG. 1. Also, the configuration of the electronic throttle apparatus is similar to what is shown in FIG. 4 through FIG. 11. Further, the system of the throttle actuator control unit (TACU) 200 is similar to what is shown in FIG. 12. Also, the configuration of the H bridge circuit 234 for use in the electronic throttle apparatus is similar to what is shown in FIG. 13.

Figure 18:
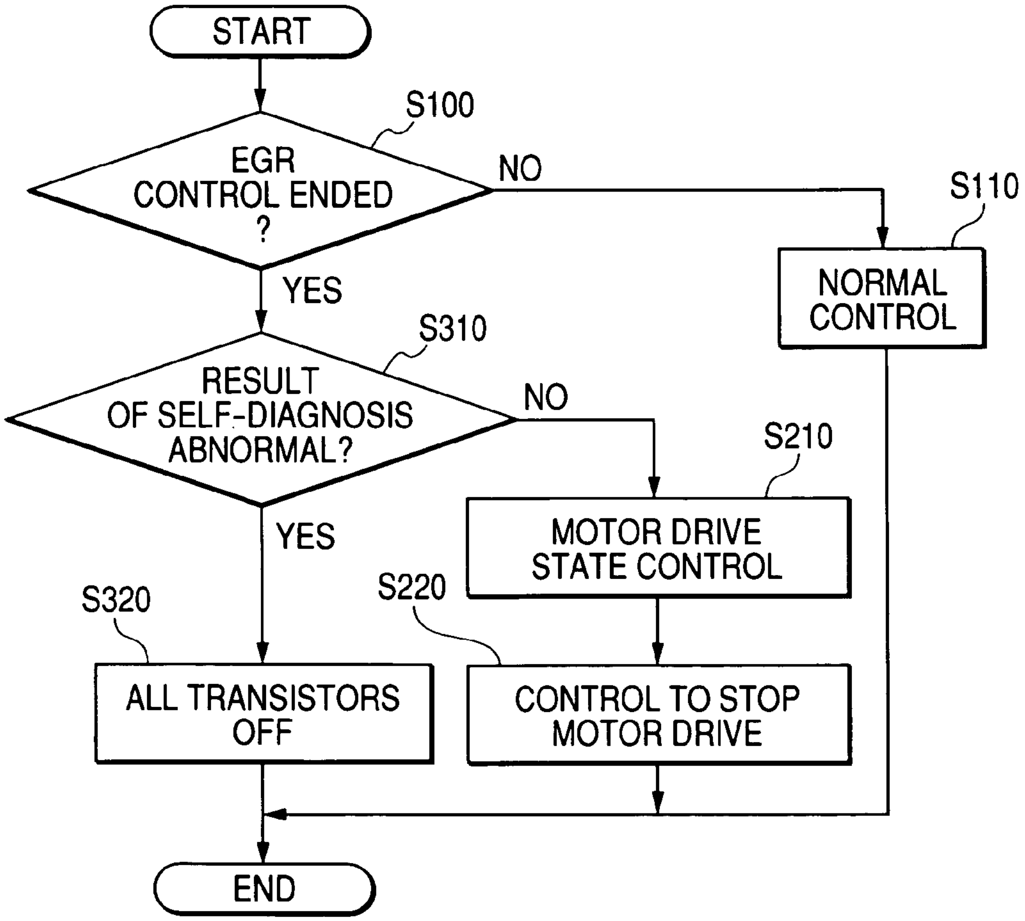
FIG. 18 is a flow chart showing the particulars of controls by the control section of the electronically controlled throttle apparatus in a third mode of implementing the invention.

FIG. 18 is a flow chart showing the contents of controls by the control section of the electronic throttle apparatus. The same step numbers as in FIG. 14 and FIG. 16 denote respectively the same control contents.

In this embodiment, the processing at step s310 and step s320 is added to the controls charted in FIG. 16.

If it is determined at step s100 that EGR control or DPF control has ended, at step s310 a flag of self-diagnosis is checked. The state of the result of self-diagnosis is confirmed here and, if no abnormality is detected, behavior at the time of connecting the motor circuit will result from regenerative braking and the stop of motor driving at step s210 and s220. Therefore, contact with the full open stopper 13 is slowly achieved.

If any abnormality is detected as a result of self-diagnosis, the control section 218 will turn off all the transistors of the H bridge circuit at step s320. As a result, the throttle valve quickly shifts to the full open position as indicated by the one-dot chain line in FIG. 15.

If any abnormality is detected as a result of self-diagnosis as stated above, any abnormality in the behavior of the actual vehicle can be prevented by stopping the control as soon as possible.

Next, the control operation by the control section 218 of an electronic throttle apparatus in the fourth embodiment of the invention will be described with reference to FIG. 19 and FIG. 20.

The system of the electronic throttle apparatus of the forth embodiment is similar to what is shown in FIG. 1. Also, the configuration of the electronic throttle apparatus is similar to what is shown in FIG. 4 through FIG. 11. Further, the system of the throttle actuator control unit (TACU) 200 of the embodiment is similar to what is shown in FIG. 12. Also, the configuration of the H bridge circuit 234 for use in the electronic throttle apparatus is similar to what is shown in FIG. 13.

Figure 19:
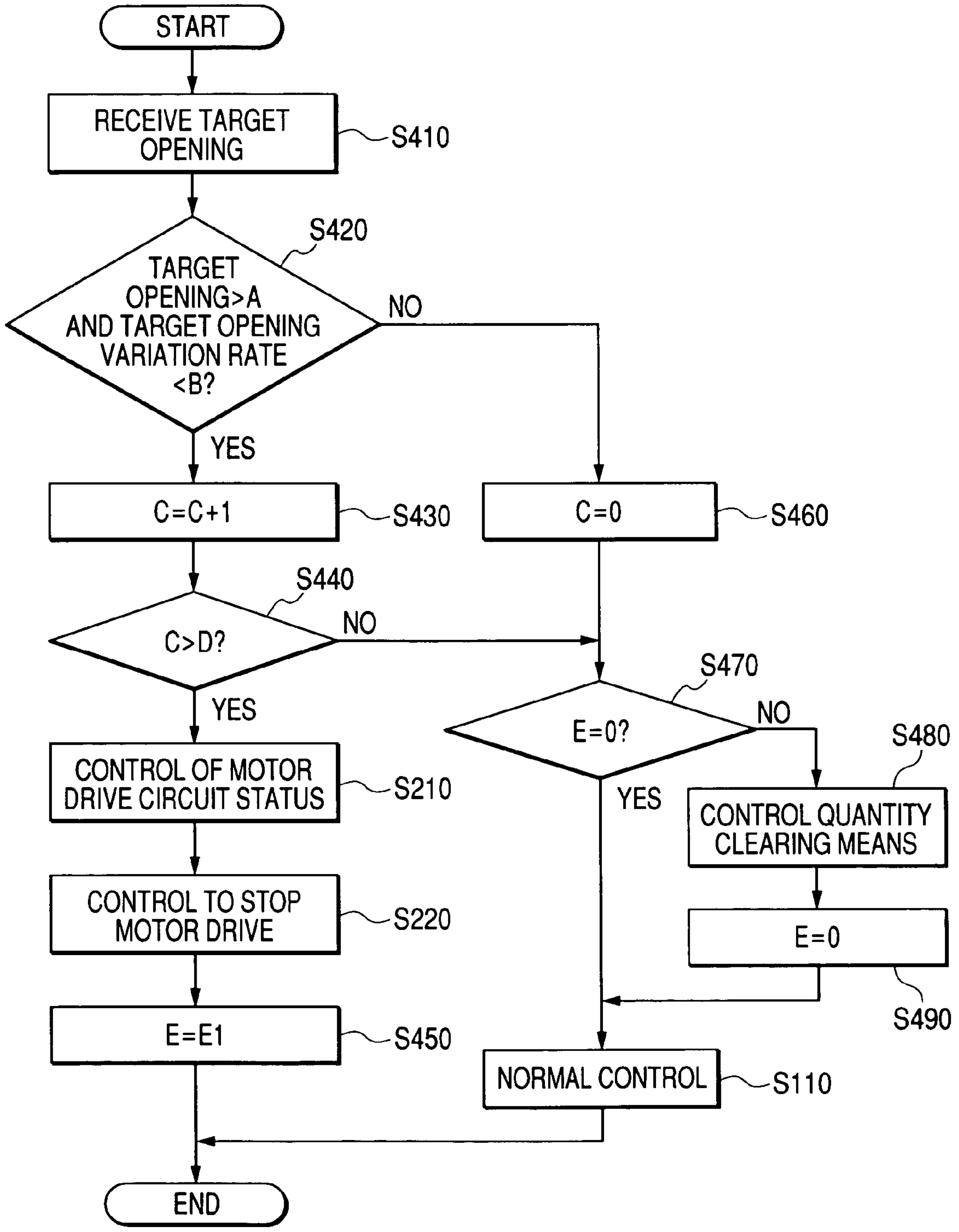
FIG. 19 is a flow chart showing the particulars of controls by the control section of the electronically controlled throttle apparatus in a fourth mode of implementing the invention.

FIG. 19 is a flow chart showing the contents of controls by the control section of the electronic throttle apparatus. FIG. 20 illustrates the time chart of controls by the control section of the electronic throttle embodiment. The same step numbers as in FIG. 14 and FIG. 16 denote respectively the same control contents.

Figure 20:
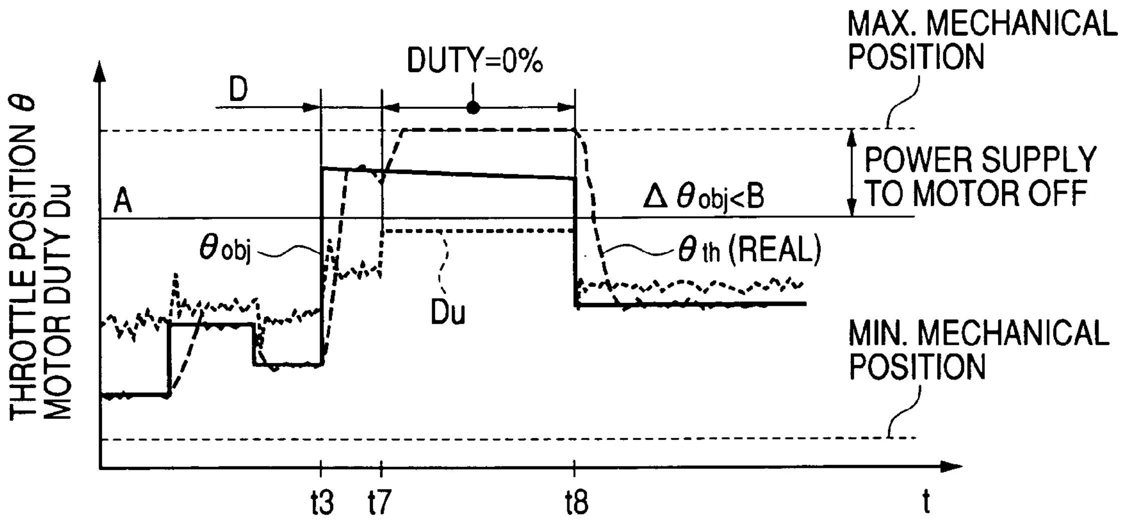
FIG. 20 illustrates the particulars of controls by the control section of the throttle apparatus in the fourth mode of implementing the invention.

In FIG. 20, the horizontal axis represents time t. The vertical axis represents the throttle opening (controlled opening) θ and the motor duty Du. Concerning the throttle opening θ, the closer one to the origin is the full close side of the throttle valve. As the throttle opening θ goes away from the origin, it comes close to the full open state. The solid line represents the target opening θObj, and the broken line is the actual opening θth (real). Concerning the motor duty Du, the closer one to the origin is close to the duty 100%. As the duty Du goes away from the origin, it comes close to 0%.

At step s410, the control section 218 receives the target opening θobj from the ECU 300, and accepts it as the reference for position control.

Then at step s420, it is judged whether or not the target opening θobj received at step s410 is greater than a predetermined value A and the variation rate Δθobj of the target opening θobj is smaller than a predetermined value B. For instance, the predetermined value A is 80%, according to which it is judged whether or not EGR control or DPF control at step s100 in FIG. 14 has ended. The reason, why the variation rate Δθobj of the target opening θobj is used as the reference in the above judgment, is to determine whether or not the target opening θobj is greater than the predetermined value A on a regular state except where the target opening θobj has become momentarily greater than the predetermined value A. The variation rate Δθobj is, for instance, 0.25%. Thus, when the target opening θobj is greater than the predetermined value A (e.g. 80%) and the variation rate Δθobj of the target opening θobj is smaller than the predetermined value B (e.g. 0.25%), it is judged that EGR control or DPF control has ended, and the processing advances to step s430. When it is not such a case, the processing advances to step s460.

At step s460, the count C is cleared to 0 for initialization. Namely, in a state in which normal EGR control or DPF control is performed, the count C is 0. Next at step s470, it is judged whether or not a variable E is 0. The variable E can take one of two values, "0" and "1". When the variable E is "0", it means a state in which the control is performed, and when the variable E is "1", it means a state in which no control is performed. Here, the control is being performed, and when the variable E is turned "0", the processing moves ahead to step s110 to perform feedback control to bring the throttle opening to the target opening. Referring to FIG. 20, until the point of time t3 is reached, the opening of the throttle valve is subjected to normal feedback control. As this point of the time t3 is where EGR control or DPF control has ended, at the time t3, the target angle for controlling the throttle valve is set to any arbitrary throttle valve position in the vicinity of the full open point. And the throttle valve is controlled so as to bring to the target angle, and the controlled throttle valve opening is held for an arbitrary duration (until the condition of C>D is satisfied at step s440).

On the other hand, when EGR control or DPF control ends, "1" is added to the count C at step s430. Then at step s440, it is determined whether or not the count C has surpassed a predetermined value D. The determination at step s440 is intended to judge whether or not a predetermined length of time has passed after EGR control or DPF control ended at step s430. The predetermined value D corresponds to the period between the points of time t3 and t7 in FIG. 20, for instance a length of time during which 200 ms is counted. This predetermined period is set longer than the length of time taken by the force of the return spring to shift to the full open side as represented by the one-dot chain line in FIG. 15 (for instance the period T4 (e.g. 150 ms) in the example of FIG. 15).

When the condition of step s440 is not satisfied, namely until 200 ms passes after the end of EGR control or DPF control for instance, it is determined at step s470 whether or not the variable E is 0. Since the control is being performed here and the variable E is "0", the processing advances to step s110, and the feedback control is performed to bring the throttle opening to the target opening. Thus, referring to FIG. 20, even between the points of time t3 and t6, the opening of the throttle valve is subjected to usual feedback control.

Such control can help to reduce the wear of the sliding resistor in the throttle sensor. In the electronic throttle apparatus using a contact type throttle sensor, if the duration of holding a constant opening (for instance the duration of holding the sensor in the fully open position) is long, it may suffer local wearing of resistors under the influence of vibration or the like. Such local wear would give rise to output abnormality in the contact type throttle position sensor. Now in the embodiment, even though, EGR control or DPF control has ended, a controlled state is maintained until a length of time corresponding to the predetermined value D passes. As a result, between the points of time t3 and t7, any arbitrary opening is held, and the duration of a mechanically held fully open position can be confined between the points of time t7 and t8, making it possible to reduce the duration of the mechanically held full open position. This reduction in the holding duration can extend the service life of the throttle position sensor.

Next, when the count C has surpassed the predetermined value D at the determination at step s440, namely the point of time t7 in FIG. 20 is reached, regenerative braking and non-braking described with reference to FIG. 16 are repeated at step s210 and step s220, the gear 9 slowly comes into contact with the full open stopper 13. In steps s210 and s220, the processing at step s210 is dispensable. The reason is that, since the control is performed for a predetermined length of time in a predetermined position near the full open point at step s110, even if power supply to the motor is cut off and a shift from that predetermined position to the full open position immediately takes place, the impact force of the gear 8 coming into contact with the full open stopper 13A is often rather small because of the limited moving distance.

After that, a control state flag (E) is set to "1" at step s450 to go out of the loop.

As described above, in this embodiment, at and after the point of time t7 where the EGR area (at and after the point of time t3) is reached and the satisfied state of the condition (C>D) has lasted long enough, braking and interruption of power supply to the motor are repeated to shift from the controlled state to a non-controlled state, the gear 8 and the full open stopper 13 slowly coming into contact with each other.

Further, when returning from a state in which EGR control or DPF control has ended to a state in which EGR control or DPF control is at work, the return is made possible if any one of the target opening>A, the target opening variation rate<B, or C>D fails to hold. In this case, as a non-control state has been gone through, the control state flag is E=1.

Therefore, the processing goes ahead to step s480 following determination at step s470, and the control quantity is cleared.

As described with reference to FIG. 12, the PID computing section 214 repeats PID computation to calculate the duty whether under EGR control or DPF control or in the absence of EGR control. PID control quantity $u(t)=(Kp\cdot\Delta\theta th+Kd\cdot(d\Delta\theta th/dt)+Ki\cdot\Sigma\Delta\theta t\cdot dt)$ is being computed. When power supply to the motor is off, the deviation of the actual opening from the target opening is greater toward the closed position side of the throttle valve, and the control duty in the closing direction is excessively heavy in the part of functioning as an integral term. Although the convergence of throttle position control is usually improved by braking in the vicinity of a new target opening, where the values corresponding to the integral term have excessively accumulated in the closing direction as described above, normal braking cannot be provided, but overshooting may become too large or the convergence may be deteriorated.

In view of this problem, in this embodiment, the control quantity is cleared to zero at step s480. The control quantity to be cleared to zero here may be only the portion corresponding to the integral term or all the values relating to the provided duty. This contributes to improving the control performance regarding the response time and other aspects. After that, the control status flag is set to E=0 at step s490 to shift to normal control, followed by going out of the loop.

As described above, in this embodiment as well, the impact energy that occurs when the full open stopper and gears or other constituent parts of the motor drive mechanism clash with each other can be reduced, making it possible to prevent the occurrence of collision noise and an effect of the impact load to shorten the service life of mechanical parts. Also, by shortening the duration of holding in the full open position, the service life of the contact type throttle sensor can be extended to an extreme length. Furthermore, when shifting from a non-controlled state to a controlled state, the control performance including responsiveness can be improved by clearing the control quantity to zero.

Next, the system of an electronic throttle apparatus in another embodiment of the present invention will be described with reference to FIG. 21.

Figure 21:
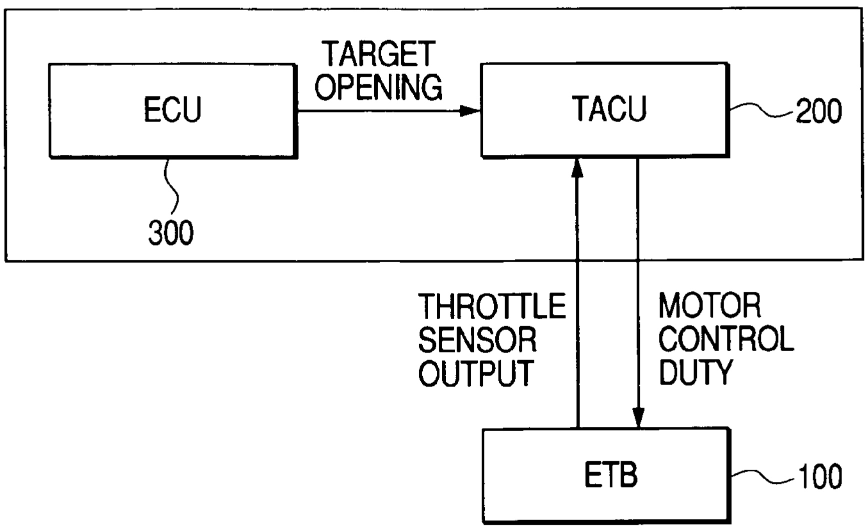
FIG. 21 is a system configuration diagram of the electronically controlled throttle apparatus in another mode of implementing the invention.

FIG. 21 is a system configuration diagram of the electronic throttle apparatus in this embodiment.

Although the TACU 200 and the ECU 300 are supposed to be separately configured in the embodiments described earlier, the TACU 200 and the ECU 300 can as well be integrally configured as shown in FIG. 21.

Other conceivable modes of the invention include the following.

1) The electronically controlled throttle apparatus according to claim 13, characterized in that the control means, when starting again the throttle valve position control using the actuator, starts control after initializing the value in the actuator driving duty computing section to be applied to the actuator.

2) The electronically controlled throttle apparatus according to claim 15, characterized in that the initialization by the control means of the value in the actuator driving duty computing section covers at least the integral term or a part performing an equivalent function.

According to the invention, reliability can be improved, no risk of damaging the motor or mechanical parts is involved, and reductions in mechanical collision noise and impact energy are made possible.

What is claimed is:

1. An electronically controlled throttle apparatus comprising:

a throttle valve held rotatably in a throttle body, an actuator for driving said throttle valve, a return spring which gives a force to return said throttle valve in the full open direction, a throttle position sensor for detecting the opening of said throttle valve, and a throttle actuator control unit for driving said actuator based on the opening of said throttle valve detected by said throttle position sensor and a target opening, wherein said throttle actuator control unit is provided with a control means which controls said actuator, when EGR control or DPF control has ended, so that said throttle valve turns toward the pull open position in a longer period of time than the length of time in which said throttle valve is tuned toward the full open position by said return spring only.

2. The throttle apparatus according to claim 1, wherein said control means performs an open loop control by providing said actuator with a control signal corresponding to a target angle which causes said throttle valve to gradually turn toward the full open position of said throttle valve.

3. The throttle apparatus according to claim 2, wherein said control means gradually decreases the duty of a duty signal given to said actuator in said open loop control.

4. The throttle apparatus according to claim 1, wherein said control means repeats, when EGR control or DPF control has ended, a controlled state and a non-controlled state of said actuator.

5. The throttle apparatus according to claim 4, wherein said control means causes, in said controlled state, said actuator to operate as a regenerative brake.

6. The throttle apparatus according to claim 4, wherein said control means cuts off, in said non-controlled state, an electric power supply to said actuator.

7. The throttle apparatus according to claim 6, wherein said control means forcibly fixes the duty of the duty signal given to said actuator to 0% and outputs it in said non-controlled state.

8. The throttle apparatus according to claim 4, wherein said control means has a selection means for selecting, as the method of returning the throttle valve position to the full open position, either said control means forcibly fixing the duty of the duty signal given to said actuator to 0% and outputting it in said non-controlled state if the result of self-diagnosis of the throttle position sensor or the like is abnormal, or said control means cutting off, in said non-controlled state, an electric power supply to said actuator if there is no abnormality in the result of self-diagnosis.

9. The throttle apparatus according to claim 4, wherein said control means repeats, after EGR control or DPF control is determined to be ended, said controlled state and said non-controlled state of said actuator after performing control to hold the opening of said throttle valve in the vicinity of the full open point for a predetermined length of time.

10. The throttle apparatus according to claim 1, wherein said control means places, after EGR control or DPF control is determined to be ended, said actuator in a non-controlled state after performing control to hold the opening of said throttle valve in the vicinity of the full open point for a predetermined length of time.

11. The throttle apparatus according to claim 10, wherein said control means repeats, after EGR control or DPF control is determined to be ended, said controlled state and said non-controlled state of said actuator after performing control to hold the opening of said throttle valve in the vicinity of the full open point for a predetermined length of time.

12. The throttle apparatus according to claim 11, wherein said control means determines that EGR control or DPF control has ended when a state in which the target opening of said throttle valve surpasses a predetermined target opening, the variation quantity of said target opening is not greater than a predetermined opening variation quantity, and the target opening is not less than a predetermined opening and its variation quantity is not greater than a predetermined opening variation quantity continues for a duration not less than a predetermined length of time.

13. The throttle apparatus according to claim 11, wherein said control means starts again the throttle valve position control using the actuator when at least one of said three conditions fails to be satisfied after having determined that EGR control or DPF control has ended.

14. The throttle apparatus according to claim 1, wherein said electronic throttle body is equipped with a first gear fixed to the output shaft of said actuator, a second gear fixed to a throttle shaft supporting said throttle valve, and an intermediate gear which transmits a driving force for said second gear from said first gear, and further equipped with a washer, which is a wear-resistant member, between said intermediate gear and said throttle body supporting this intermediate gear.

15. The throttle apparatus according to claim 1, wherein said throttle body is equipped with a first gear fixed to the output shaft of said actuator, a second gear fixed to a throttle shaft supporting said throttle valve, and an intermediate gear which transmits a driving force for said second gear from said first gear, and further equipped with a washer, which is a wear-resistant member, between said intermediate gear and said throttle body supporting this intermediate gear.

16. An electronically controlled throttle apparatus comprising:

a throttle valve held rotatably in a throttle body, an actuator for driving said throttle valve, a return spring which gives a force to return paid throttle valve in the fall open direction, a throttle position sensor for detecting the opening of said throttle valve, and a throttle actuator control unit for driving said actuator based on the opening of said throttle valve detected by said throttle position sensor and a target opening, wherein said throttle actuator control unit is provided with a control means which controls said actuator, when EGR control or DPF control has ended, so that said throttle valve turns toward the full open position in a longer period of time than the length of time in which said throttle valve is turned toward the pull open position by said return spring only;

furthermore, the particulars of said control means is that performs an open loop control by providing said actuator with a control signal corresponding to a target angle which causes said throttle valve to gradually turn in the pull open direction of said throttle valve.

17. The throttle apparatus according to claim 16, wherein said throttle body is equipped with a first gear fixed to the output shaft of said actuator, a second gear fixed to a throttle shaft supporting said throttle valve, and an intermediate gear which transmits a driving force for said second gear from said first gear, and further equipped with a washer, which is a wear-resistant member, between said intermediate gear and said throttle body supporting this intermediate gear.

18. An electronically controlled throttle apparatus comprising:

a throttle valve held rotatably in a throttle body, an actuator for driving said throttle valve, a return spring which gives a force to return said throttle valve in the full open direction, a throttle position sensor for detecting the opening of said throttle valve, and a throttle actuator control unit for driving said actuator based on the opening of said throttle valve detected by said throttle position sensor and a target opening, wherein said throttle actuator control unit is provided with a control means which repeats, when EGR control or DPF control has ended, a controlled state and a non-controlled state of said actuator, so that said throttle valve turns toward the full open position in a longer period of time than the length of time in which said throttle valve is tuned toward the full open position by said return spring only.

19. The throttle apparatus according to claim 18, wherein said throttle body is equipped with a first gear fixed to the output shaft of said actuator, a second gear fixed to a throttle shaft supporting said throttle valve, and an intermediate gear which transmits a driving force for said second gear from said first gear, and further equipped with a washer, which is a wear-resistant member, between said intermediate gear and said throttle body supporting this intermediate gear.

20. An electronically controlled throttle apparatus comprising:

a throttle valve held rotatably in a throttle body, an actuator for driving said throttle valve, a return spring which gives a force to return said throttle valve in the full open direction, a throttle position sensor for detecting the opening of said throttle valve, and a throttle actuator control unit for driving said actuator based on the opening of said throttle valve detected by said throttle position sensor and a target opening, wherein said throttle actuator control unit is provided with a control means which controls said actuator, when EGR control or DPF control has ended, so that said throttle valve turns toward the full open position in a longer period of time than the length of time in which said throttle valve is turned toward the full open position by said return spring only, furthermore, the particulars of said control means is that repeats said controlled state and said non-controlled state of said actuator after performing control to hold the opening of said throttle valve in the vicinity of the full open point for a predetermined length of time.

21. The throttle apparatus according to claim 20, wherein said throttle body is equipped with a first gear fixed to the output shaft of said actuator, a second gear fixed to a throttle shaft supporting said throttle valve, and an intermediate gear which transmits a driving force for said second gear from said first gear, and further equipped with a washer, which is a wear-resistant member, between said intermediate gear and said throttle body supporting this intermediate gear.

22. An electronically controlled throttle apparatus comprising:

a throttle valve held rotatably in a throttle body, an actuator for driving said throttle valve, a return spring which gives a force to return said throttle valve in the full open direction, a throttle position sensor for detecting the opening of said throttle valve, and a throttle actuator control unit for driving said actuator based on the opening of said throttle valve detected by said throttle position sensor and a target opening, wherein said throttle actuator control unit is provided with a control means which controls said actuator, when EGR control or DPF control has ended, so that said throttle valve turns toward the full open position in a longer period of time than the length of time in which said throttle valve is turned toward the full open position by said return spring only, furthermore, the particulars of said control means is that places said actuator in a non-controlled state after performing control to hold the opening of said throttle valve in the vicinity of the full open point for a predetermined length of time.

23. The throttle apparatus according to claim 22, wherein said throttle body is equipped with a first gear fixed to the output shaft of said actuator, a second gear fixed to a throttle shaft supporting said throttle valve, and an intermediate gear which transmits a driving force for said second gear from said first gear, and further equipped with a washer, which is a wear-resistant member, between said intermediate gear and said throttle body supporting this intermediate gear.

* * * * *